(12) United States Patent
Hayden et al.

(10) Patent No.: US 11,567,710 B2
(45) Date of Patent: Jan. 31, 2023

(54) METAL DECO DIGITAL PROOFING PROCESS

(71) Applicant: SUN CHEMICAL CORPORATION, Parsippany, NJ (US)

(72) Inventors: Richard Hayden, Bristol (GB); Robin Cater, Bristol (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 17/633,825

(22) PCT Filed: Aug. 21, 2020

(86) PCT No.: PCT/US2020/047302
§ 371 (c)(1),
(2) Date: Feb. 8, 2022

(87) PCT Pub. No.: WO2021/035105
PCT Pub. Date: Feb. 25, 2021

(65) Prior Publication Data
US 2022/0276811 A1 Sep. 1, 2022

Related U.S. Application Data

(60) Provisional application No. 62/889,597, filed on Aug. 21, 2019.

(51) Int. Cl.
*G06F 3/12* (2006.01)
*B44D 3/00* (2006.01)
(Continued)

(52) U.S. Cl.
CPC ........... *G06F 3/1208* (2013.01); *B44D 3/003* (2013.01); *H04N 1/00023* (2013.01); *H04N 1/60* (2013.01)

(58) Field of Classification Search
CPC .. G06F 3/1208; B44D 3/003; H04N 1/00023; H04N 1/60
See application file for complete search history.

(56) References Cited

U.S. PATENT DOCUMENTS 6,381,036 B1 4/2002 Olson
6,717,673 B1 4/2004 Janssen et al.
(Continued)

FOREIGN PATENT DOCUMENTS

JP 2009-089374 4/2009
JP 2010-509609 3/2010
(Continued)

OTHER PUBLICATIONS

International Search Report issued in International Application No. PCT/US2020/047302, dated Nov. 18, 2020.
Written Opinion of the International Searching Authority issued in International Application No. PCT/US2020/047302, dated Nov. 18, 2020.
Written Opinion of the International Searching Authority issued in International Application No. PCT/US2020/047302, dated Aug. 20, 2021.
(Continued)

*Primary Examiner* — Quang N Vo
(74) *Attorney, Agent, or Firm* — Marian E. Fundytus; Ostrolenk Faber LLP.

(57) ABSTRACT

The described herein is a method for identifying a best match to a metal deco target color and distributing the best match to interested parties for ongoing validation. The method creates a digital proofing database that matches, for example, PantoneLIVE™ target colors and sets a defined digital inkjet standard to within desired tolerances. Also described is a system that implements the method.

19 Claims, 20 Drawing Sheets

(51) Int. Cl.
    *H04N 1/00*     (2006.01)
    *H04N 1/60*     (2006.01)

(56) References Cited

U.S. PATENT DOCUMENTS

| | | | |
|---|---|---|---|
| 2004/0233463 A1* | 11/2004 | Hersch | C09D 11/02 358/1.9 |
| 2007/0062388 A1 | 3/2007 | Thomas | |
| 2010/0067056 A1* | 3/2010 | Rich | H04N 1/54 358/1.15 |

FOREIGN PATENT DOCUMENTS

| | | | |
|---|---|---|---|
| JP | 2012-227591 | | 11/2012 |
| JP | 2016-139223 | A | 8/2016 |
| JP | 2018-192405 | | 12/2018 |
| WO | WO 00/76205 | A1 | 12/2000 |
| WO | WO 2012/077729 | A1 | 6/2012 |
| WO | WO 2015/114833 | A1 | 8/2015 |
| WO | WO 2016/163266 | A1 | 10/2016 |

OTHER PUBLICATIONS

International Preliminary Report on Patentability (Chapter 1 of the Patent Cooperation Treaty) issued in International Application No. dated Nov. 19, 2021.

Pantone: "Graphics—Get the Packaging Color Right Before It Goes Wrong", Oct. 10, 2017, XP055748194, Retrieved from the Internet: URL:https://www.pantone.com/color-intelligence/articles/technical/get-the-packaging-color-right-before-it-goes-wrong [retrieved on Nov. 9, 2020].

Pantone: "Graphics—Facts about On-Demand Prints", Jun. 14, 2017, XP055748229, Retrieved from the Internet: URL:https://www.pantone.com/color-intelligence/articles/technical/facts-about-on-dem and-prints [retrieved on Nov. 9, 2020].

Pantone: "Pantone Color Institute—Articles 1 Pantone", Jul. 2, 2019, XP055748211, Retrieved from the Internet: URL:https://web.archive.org/web/20190702041313/https://www.pantone.com/color-intelli gence/articles/#section3 [retrieved on Nov. 9, 2020].

Japanese Office Action dated Jul. 19, 2022 in counterpart JP application No. 2022-511063 with English language summary.

\* cited by examiner

METAL DECO DIGITAL PROOFING PROCESS

CROSS REFERENCE TO RELATED APPLICATIONS

The present application is a § 371 National Phase application based on PCT/US2020/47302 filed Aug. 21, 2020, which claims the benefit of U.S. Provisional Application No. 62/889,597, filed Aug. 21, 2019, the subject matter of each of which is incorporated by reference in their entirety.

FIELD OF INVENTION

The present disclosure concerns the design of colors for metal articles to which colored metal deco inks will be applied, such as application by a digital printing process, and in providing the best match of a color to a target color through the digital proofing process described herein. Such metal articles include packaging such as aluminum cans, but may include other metal articles, such as flat panel signage and artwork.

BACKGROUND OF THE INVENTION

Color selection of customer colors for printing on metal surfaces for packaging (e.g., aluminium cans) and other items is presently a time consuming and arduous process requiring the ink company, can maker or converter to actually and physically print inks onto a metal surface. While at first, the matter may seem to be a simple one, in actuality the process is complicated, since satisfying the customer requirement of meeting a target color may require selecting one particular color out of literally hundreds of closely related colors that differ merely incrementally in for example, the CIELAB color space. While for example one could start by selecting a color from a library book of colors, such as the Pantone books, how that color appears when actually printed on a substrate may be not meet expectations. Factors that go into how the color might actually appear include the lighting environment and the material on which the color is printed. Other factors that can affect how a color might actually appear once printed or applied to a metal surface can include reflectivity of the metal surface (which could be affected by the curved surface of a can), and the opacity/transparency of the color that is printed. Metamerism may also be an issue. Selecting a paper color swatch in a Pantone library book can thus be unreliable, subjective, or both.

A metal deco color is the color of a fit-for-purpose printing ink applied to a metal decorating substrate using the metal deco application process or a method that simulates the metal deco application process (like in laboratory conditions, the IGT proofer).

While relying upon the opinion of experienced colorists who identify a best match for a color target is one possible way to select a best match, that approach still remains open to individual interpretation.

Currently no method exists to translate a measured color file (such as a pre-defined Pantone metal deco color file, which may be a PantoneLIVE color file) that can color a metal deco ink formulation for application to a metallic substrate, into a physical representation of that color on a metal substrate without preparing actual samples or proofs of the inks such substrates, or without supplying wet inks. Also, the parties to a design project, which for example may developers, printers, customers and manufacturers are typically situated remotely from each other in different parts of the country, or even in different parts of the world. Physical samples of the ink printed on substrates would have to be shipped to each party in order to evaluate the color appearance and whether it matches the target color. This compounds the problem since shipping time slows down the evaluation and color approval process. The advantage of a pre-defined color file such as discussed above is that since it is predefined, it is a color that required no interpretation when performing ink matching and when formulating same. A measured color file is a pre-defined digital target like found in the PantoneLIVE libraries.

SUMMARY OF THE INVENTION

Described herein is a digital proofing process for the selection of a metal deco color from a digital color data base that is a best match to a target color. The matching occurs with a high degree of accuracy.

In one aspect, described herein is a method for identifying a best match to a metal deco target color and distributing the best match to interested parties, comprising the steps of:

A) selecting a first candidate color as a match to a metal deco target color from a database of metal deco ink colors;

B) generating in a computer implemented environment an arrangement of colors comprising the first candidate color and one or more further candidate colors that differ from each other in color increments;

C) printing on a transparent sheet the arrangement of colors to create a digital proof of the plurality of colors;

D) laying the digital proof over a metal substrate to provide a simulation of the application of metal deco colored inks on the metal substrate;

E) selecting a color from among the arrangement of colors on the digital proof as a best match to the metal deco target color; and F) Storing color data of the best match to the metal deco target color in a computer storage location for retrieval by other parties.

In one aspect, step F is a step F1 in which color data for the best match to the metal deco target color, along with other pertinent information (e.g., printer separations, CIELAB color space information, information concerning the digital proofer such as proofer model, and digital proofer settings, etc.), is saved to computer storage, such as a cloud storage device, where it can be distributed to or retrieved by one or more parties with access to the storage device. At least one or more of those parties can replicate the conditions and components employed in digital proofing process described herein, such as steps A to E, and in so doing provide confirmation that the color chosen is the best match, or disagree with the best match determination. Such one or more parties may be those with access to the ORIS CGS Flex Pack software, which can run on the Windows 7 or higher operating system, (16 GB RAM, 512 HDD (SSD if possible), and a compatible graphics card.

In another aspect, step F is a step F2 in which the printed color that is the best match to the metal deco target color is measured by an optical device such as a spectrophotometer in order to determine whether, within an acceptable tolerance, the output of the digital proofer accurately reproduces the previously defined digital representation of the desired color and to provide validation data to validate the printed color against the previously defined digital representation of the desired color. The data obtained from the spectrophotometer measurements may be stored in a database such as the Sun Digital Proofing MD 2P database or spot color database, which are available in a cloud based solution such as myColorCloud, which can be accessed through the SunColorQC software platform. In this manner, quality control reports and information on whether a color can continue to be achieved within specified tolerances using the current ink mix on a given press can be provided. The data stored includes CIELAB color coordinates and reflectance data.

The measured data of an inkjet print does not correlate to the measurements of a metal deco ink print, and thus the approval process for selected best match colors is a visual one. Thus, the matching of colors on digital print standards to PantoneLIVE physical prints is a visual one and it is through the visual process that standards are set. The colorists, i.e., color matchers, that perform matching and validation are trained to spot small color differences based on their experience, which may be many years of experience, so the selected and defined the digital proof color will fall within the desired tolerance in terms of its comparison to the PantoneLIVE physical target color, which will satisfy all parties to the design project.

The validation data referred to above is report generated by quality control software which indicates whether the digital proof matches the predefined target color that has been entered into the Sun Digital Proofing MD 2P database. It is akin to a certificate of conformity indicating that the digital proof lies within acceptable tolerances.

In one aspect, the selecting of a first candidate color in step A is the selecting of a PantoneLIVE color or a bespoke color.

In one aspect, the spot color database is a bespoke spot color database.

In one aspect, one or both of steps F1 and F2 may be performed.

In one aspect, the target color and the best match to the metal deco target color are spot colors, such as, for example, bespoke spot colors.

Bespoke color is one that is not a Pantone/PantoneLIVE reference color.

In one aspect, the target color is provided by a target color representation, such as a color swatch that comprises the target color printed on a substrate.

In one aspect, the database of step A is a database containing one or more Pantone libraries of metal deco colors, such as for example, the PantoneLIVE™ color libraries for metal deco colors.

In one aspect, the computer implemented environment mentioned in step B includes a central processor unit (CPU) which runs the CGS ORIS Flex Pack software suite. The database of Step A may also be accessed by the CPU. The CPU may be a microprocessor. In an alternative arrangement, the software and databases may be stored remotely, such as in a cloud computing environment.

In one aspect, the step A selection of a first candidate color is performed by selecting a color from a PantoneLIVE™ metal deco color database or from a party's bespoke color database hosted in a myColorCloud library hosted by PantoneLIVE.

In one aspect, the Pantone color database is linked to the CGS ORIS Flex Pack software suite and the step A selection of a first candidate color is performed by employing the CGS ORIS Flex Pack software suite to select a color from the Pantone color database, such as for example the PantoneLIVE™ metal deco color database.

In one aspect, the step A selection of a first candidate color is performed by optically analyzing a physical specimen that includes the metal deco target color with an optical analyzer to obtain color data such as printer separations for the target color representation and then assigning the same data into a computer system capable of making a color selection, such as the environment mentioned in step B. The computer system may be one running the CGS ORIS Flex Pack software suite, which is linked to the Pantone metal deco color database, i.e., the PantoneLIVE™ metal deco color databases. The physical specimen may be the color swatch. The optical analyser may be a spectrophotometer. Optical analysis may be performed in a light booth.

In one aspect, the step A selection of a first candidate color from a Pantone metal deco color database is made by a party selecting same from a database linked to the CGS ORIS Flex Pack software suite.

In one aspect, the first candidate color and one or more further candidate colors that differ incrementally from each other differ as such in a color space, such as the CIELAB color space and or differ incrementally in printer separations, which are the color mixtures that comprise each of the colors (i.e., the first candidate color and one or more further candidate colors).

In one aspect, the color data associated with the best match to the metal deco target color that is stored in a computer storage location is one or more of the printer separations, CIELAB color space information, and information concerning the digital proofer.

In one aspect, the printing of the digital proof in step C occurs on a Roland digital proofer, such as the Roland Versa CAMM VS-300i Eco Solvent Inkjet Printer.

In one aspect, the first candidate color and one or more further candidate colors are visually arranged in an array comprised of cells that correspond to the first candidate color and one or more further candidate colors.

In one aspect, the array is a honeycomb array comprised of cells that correspond to the first candidate color and one or more further candidate colors.

In one aspect, the best match to the metal deco target color selected in step E is saved to computer storage by selecting a cell corresponding to the best match that is present in a computer generated visual representation of the arrangement of colors, such as an array of colors, e.g., a honeycomb array of colors.

In one aspect, the printer separations of the color from the digital proof that is selected in step E is saved to computer storage.

In one aspect, the metal substrate of step D has a curved surface.

In one aspect, the selecting of the best match in step E comprises: evaluating the digital proof comprising the first candidate color and one or more further candidate colors as it is positioned over the metal substrate in a lightbox and inspecting each color at angles of 0°, 45°, and 90° under D50 light source, as shown in FIGS. 18A, 18B, and 18C, and then selecting the best match to the metal deco target color.

In another aspect, the color that is selected a best match to the metal deco target color in step E is selected to be the first candidate color in step A, and then steps B to F, and optionally steps F1 and/or F2, are performed again.

In another aspect, described herein is a system for creating a digital proof of a metal deco ink of a specific color representing a closest match to a target color; one or more inputs through which a first candidate color for a target color match is received by the system (which could be input by manual selection or input through information received from an optical analyzer); a target color match generator that generates a plurality of colors comprising the first candidate color and one or more further candidate colors that differ from each other in color increments; a digital proofer for printing the plurality of colors on a transparent sheet to create a digital proof comprising the plurality of colors printed on the sheet; an input for selecting a color from among the array of further candidate colors printed on the digital proof as a best match to the metal deco target color, and accessible storage for storing best match color data.

In one aspect, the digital proof is printed on a Roland inkjet printer.

In one aspect, the system further includes an optical analyzer such as a spectrophotometer, preferably a spherical spectrophotometer.

In one aspect, the first candidate color for a target color match that is received by the system is received from a database or received from the input of a manual color target.

The terms "differ" or "differing", "from each other in color increments" refers to incremental differences in printer separations in one or more color directions.

In another aspect, described herein is a method of selecting and validating a standard color as a best match color comprising:

A) accessing a database that comprises Pantone reference colors;

B) correlating a Pantone reference color present in an accessible design file present in the database to a digital proof color target;

C) printing the digital proof color target onto a transparent sheet to provide a digital proof;

D) laying the digital proof over a metal substrate to provide a simulation of the application of metal deco colored ink on a metal substrate; and E) measuring the digital proof while layed over the metal substrate with a sphere spectrophotometer and comparing generated spectrophotometer data to corresponding data for the digital proof color target present in a further database in order to validate the digital proof as a reproduction of digital proof color target.

In a further aspect, the Pantone reference colors are present in a design file.

In another aspect, the accessible design file is one that is imported into a CGS ORIS FlexPack software In a further aspect, the database is a Sun Digital Proofing MD 2P database.

In another aspect, the database is hosted in a cloud computing environment, such as the CGS cloud.

In a further aspect, the digital proof color target is a Pantone target such as PMS 485C mapped to SUN 485D O 2P or SUN 485D T 2P Sun Digital Proofing MD 2P target i.e., PMS 485C mapped to SUN 485D O 2P or SUN 485D T 2P.

In a further aspect, the digital proof color target is an opaque or transparent color.

In a further aspect, the further database is a SunColorQC database.

In a further aspect, the SunColorQC database is stored in myColorCloud.

Correlation is a matter of using the same color reference, e.g., PMS 485C correlates to SUN 485D O 2P or SUN 485D T 2P, For a bespoke color (not PantoneLIVE) then the user measures the desired bespoke color physical print or roll out or even be supplied with a cxf measurement of the target color and this information can be imported in the Pantone-LIVE Visualizer or X-Rite Color iQC software, which compares this measurement to the entire PantoneLIVE library to determine if there is an existing PantoneLIVE color that matches this bespoke target to within a desired tolerance. If located, this PantoneLIVE color can be used instead of the bespoke color. If not, then the bespoke color is used and the user will create the digital match as described earlier, rather than just using the pre defined PantoneLIVE color.

The inventions described in the present disclosure solve an existing problem by creating a simulation to the metal deco color through wrapping an inkjet-printed transparent film containing an arrangement of printed colors, such as in a honeycomb array, onto a metal substrate and capturing the color data as both inkjet printer separation values and a measured color data to be used remotely in the recreation of the simulation process. The process described herein creates a digitally printed inkjet version of a physically printed metal deco ink by setting the opacity of the color and generating color iterations, selecting a best match to a target color, optionally refining the best match with further interactions, and validating the determined best match. This process can be performed by making selections of colors found in the PantoneLIVE™ Metal Deco Dependent library as candidate colors for the best match to a target color. Subsequent distribution and quality control performed on the best match color provides for ongoing validation.

The amount of opacity and/or transparency of a color are design choices (such as a choice made by the brand owner), as on final production the brand owner may want a reflective/transparent color or to slightly mask the aluminum can on which the color is printed by adding white to increase the opacity of the printed ink. The brand owner may call for a mixture of transparent and opaque colors in a design to give contrast and effect. These can be adjusted during the color selection and color creation process described herein.

In another aspect, described herein is a method for creating a digital database comprised of colors stored in a digital library which database can be accessed to find matches between PantoneLIVE™ colors and target colors. The database sets defined digital inkjet standards to PantoneLIVE™ within desired tolerances, that is, the predefined digital proofing database that has been created in steps A to E, or in other words, the digital proofing representation of the PantoneLIVE™ color so that the party does not have to engage in its own interpretation of color, which if they did, would add confusion and complexity when creating digital prints and proofs.

Because the selection of a color as a best match and approval thereof is visual and relies on observation, Applicant can set digital proof standards through the representation of PantoneLIVE colors for use in evaluating and approving of matches on a digital proof to the PantoneLIVE standard. The match will fall within a desired visual tolerance for the parties, including the customer. Therefore the customer accept the digital proof as being a good match to the PantoneLIVE standard.

In the described system and method, a pre-defined database corresponding the PantoneLIVE™ metal deco ink dependent libraries is created. The database can be made available to interested parties involved in the creation of brand materials, such as packaging printed with metal deco inks, such packaging including aluminum cans. The system and method eliminate the need for the parties to a design project to create their own interpretation of PantoneLIVE™ metal deco colors on an inkjet printer, since the information is shared among all parties after uploading the color data information to a storage device. The system and method also provide for the distribution of the target data derived from the digital proof for ongoing quality control. Further, the method and system allow for the calibration of remote digital proofers, so that parties involved in the verification and validation of a color selection are printing consistent to a uniform standard.

According to the described method, by creating a digital proof to find the best match to a target color from among defined metal deco color candidates, such as those colors present in the PantoneLIVE™ 2P Metal Deco Dependent libraries, the time and effort find the best color match to a target color will be reduced relative to the current state of the art. Further, the creation of a digital database will save time, effort and set a defined digital inkjet standard within desired tolerances for pre measured colors.

BRIEF DESCRIPTION OF THE DRAWINGS

FIG. 9 is a screen shot of a computer monitor displaying a "Manual Spot Color Input" window.

FIG. 12 is a screen shot of a computer monitor displaying the "Manual Spot Color Input" window, showing changes in device color relative to the original device color.

FIG. 16 is a screen shot of a computer monitor displaying the measured standard with the Lab references shown.

FIG. 17 is a screen shot of a computer monitor displaying the measured trial, showing the differences set out in the template compared to the measured standard.

DETAILED DESCRIPTION

Figure 1:
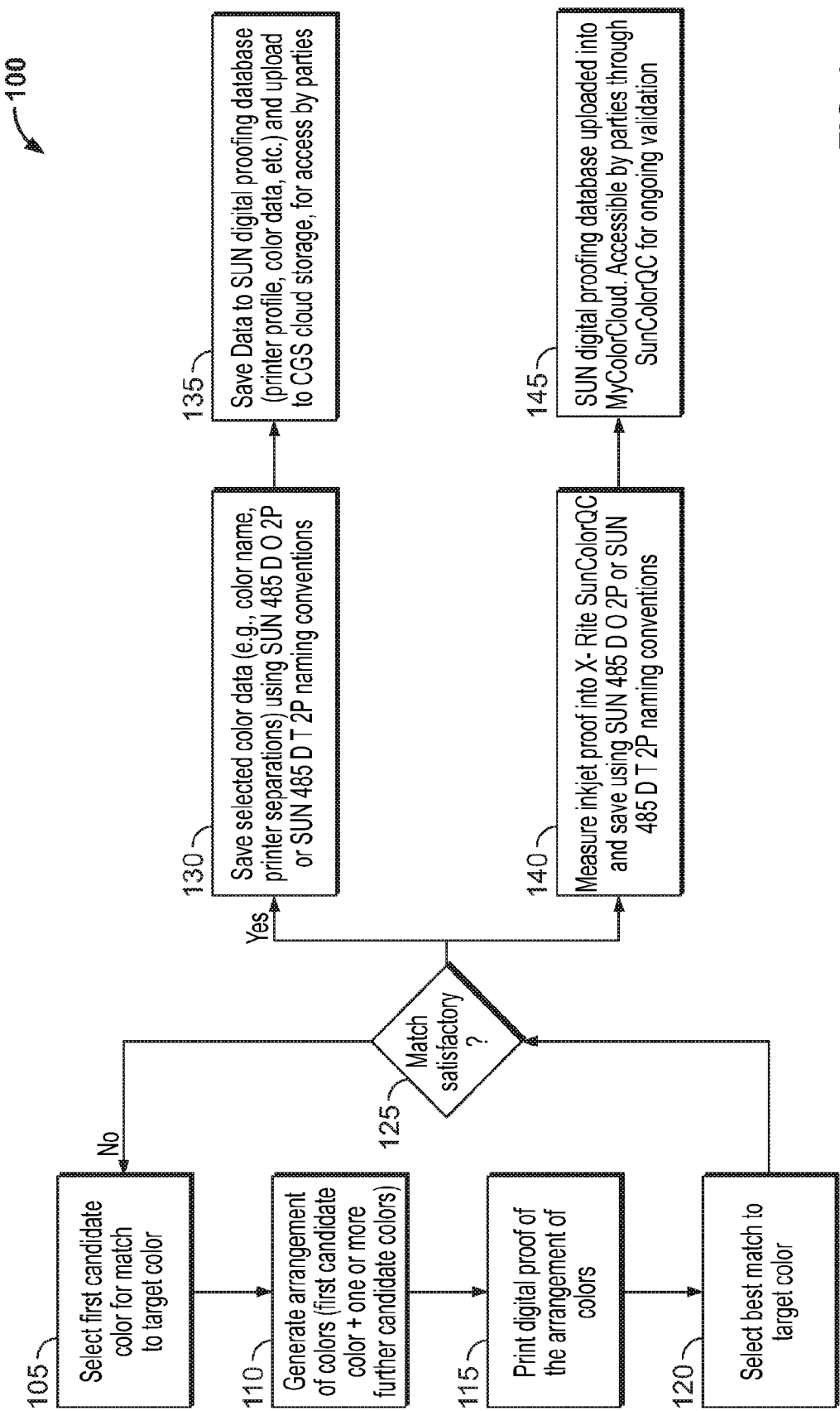
FIG. 1 is a workflow diagram of an exemplary embodiment of a method described herein.
Figure 4:
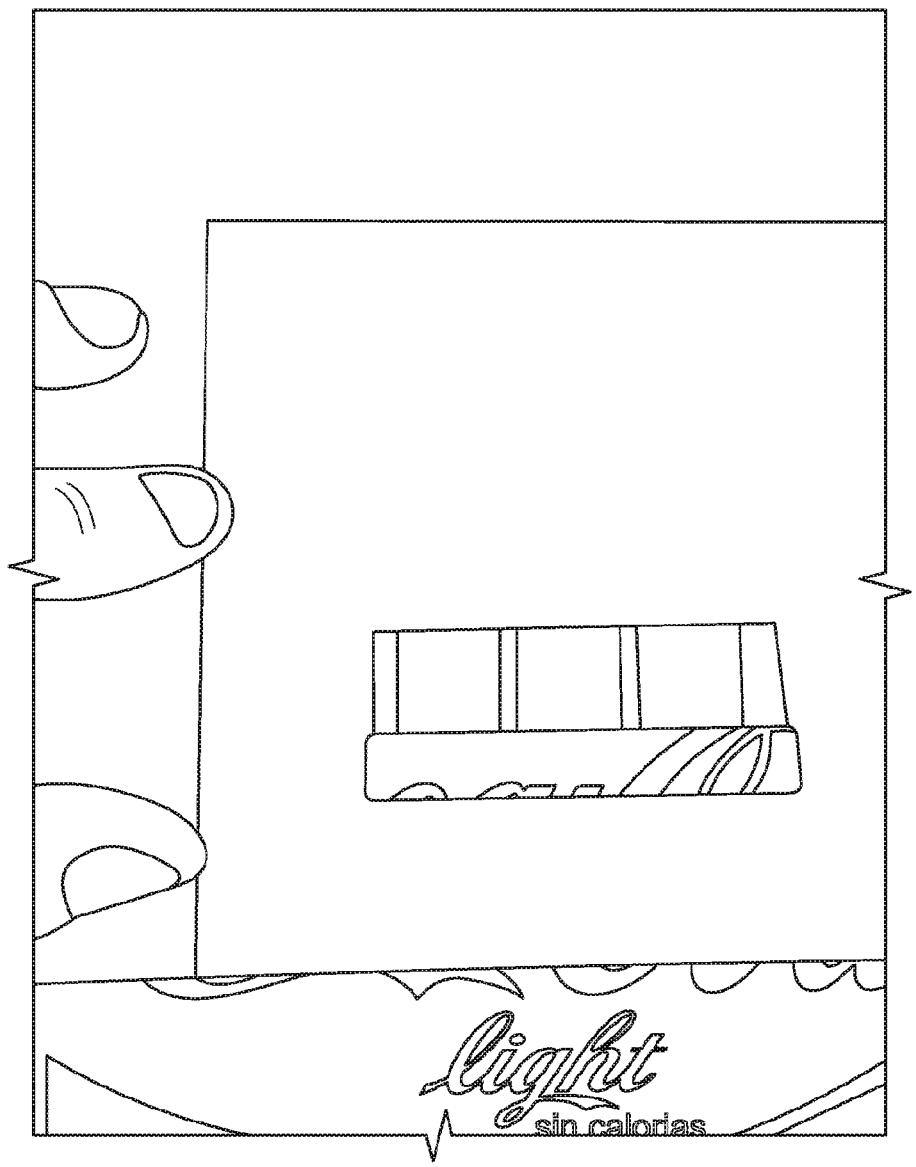
FIG. 4 shows target colors on a color swatch.

Referring to FIG. 1, an embodiment of the described method 100 will be described. In block 105, a color is selected as a first candidate color as a possible best match to a target color. The target color may be provided on a physical specimen, such as a color swatch, as shown in FIG. 4.

The specification of the target color allows the CGS software to make a first prediction of the inkjet separations for the Roland inkjet printer. Further, since a Roland printer profile is provided as part of the database of information (as later explained herein), the first prediction should be close to the target, and should be present in the first honeycomb that is generated.

Figure 5:
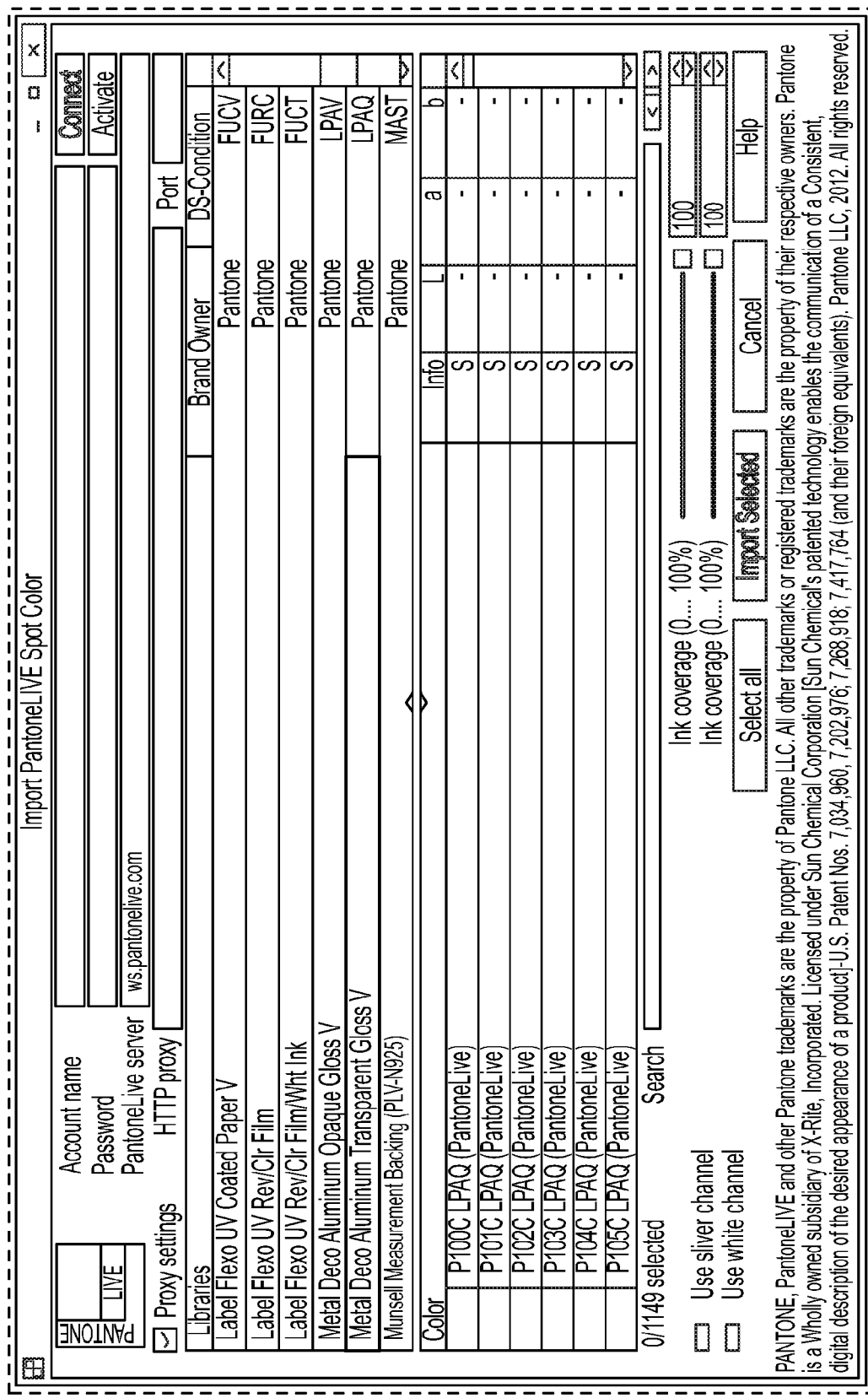
FIG. 5 is a screen shot of a computer monitor displaying a color library and colors within the library.

In one aspect, a party may manually select a first candidate color from a metal deco digital color library, such as the PantoneLIVE™ dependent library. The color selected may one listed in a spot color table listing the colors of the library. Such a library and color table are shown in FIG. 5. In another aspect, the target color may be optically analyzed in order to capture its color data. For example, using a spherical spectrophotometer as the optical analyzer, the spectral data for the target color is captured. A spherical spectrophotomer is best when measuring on a reflective surface. A multi-angle spectrophotometer could also be used. The data (D50/2 SPIN) is entered into a spot color table in the CGS software. The spot color table is linked to a standard device profile (i.e., the color space of the reference printer) and calculates an initial prediction of the separations of inkjet components on a Roland inkjet printer to generate a digital color simulation that is the subject of block 110. The standard device profile allows for all printers, wherever situated (i.e., in different party locations) to align and perform in a virtually uniform manner. Digital proofing employs D50/2 illumination as a standard. A suitable spherical spectrophotometer is the X-Rite Ci64. "/2" is the angle, so /2 SPIN is specular included and is the measurement mode.

Once spectral color data for a bespoke color or taken from PantoneLIVE is input into the CGS ORIS software, the D50/2 LAB values are mapped into the device profile, and the software determines the color in the reference profile color space that is needed for the inkjet separation/combination. This is the first prediction for how to achieve the desired color, whether it be a PantoneLIVE color or a bespoke color based on the color space of the Roland printer. For example for a red the software determines the amounts of colors to achieve the red, e.g., it determines x amount of Magenta plus y amount of Yellow from the Roland printer (inkjet head separation/combination) to achieve the desired color. However, as this is a first prediction that is not always accurate, a honeycomb array of colors is provided to increase the potential match candidates.

Figure 13A:
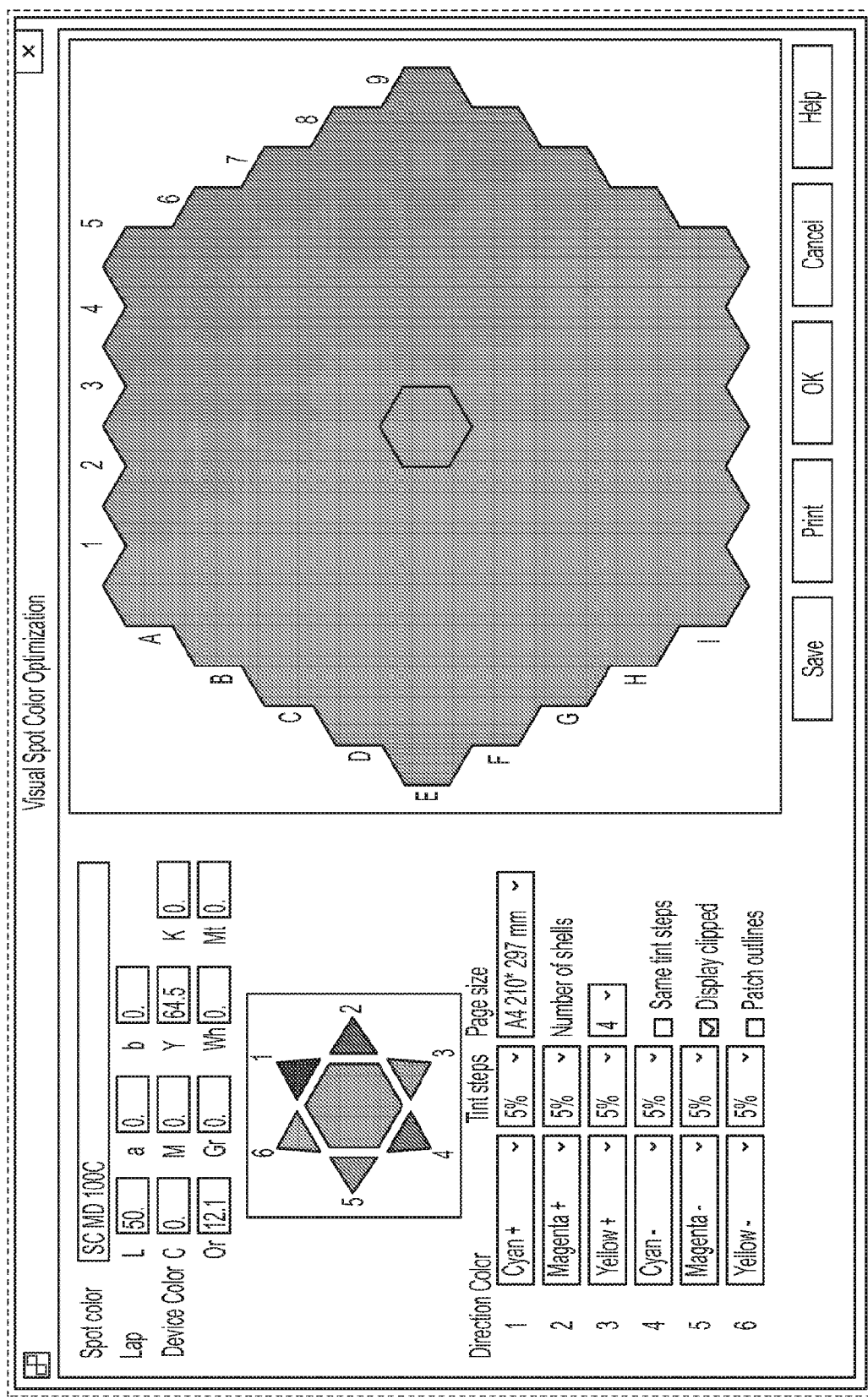
FIGS. 13A and 13B show screen shots of a computer monitor displaying the opened "Visual Spot Color Optimization" window for "SC MD 100C", and arrangements of colors that have been generated by the CGS ORIS Flex Pack software for SC MD 100C.
Figure 13B:
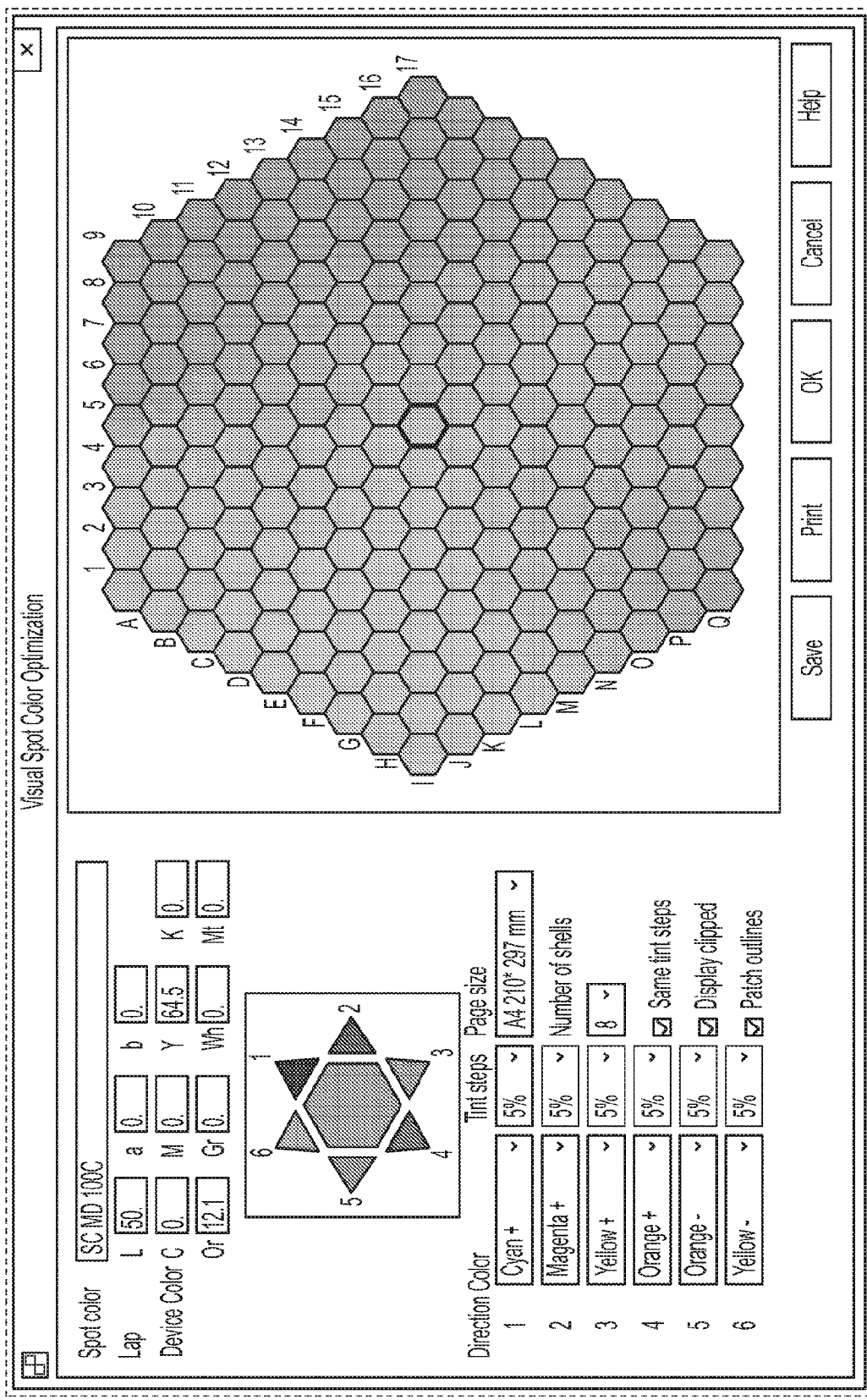

In block 110, an arrangement of colors is generated which includes colors in addition to the first candidate color. An exemplary color generation is shown in FIGS. 13A and 13B, which show screen shots of a computer monitor displaying arrangements of colors that have been generated by the CGS ORIS software. The arrangement of colors is a honeycomb array. FIGS. 13A and 13B show the spot color name ("SC MD 100C"), the LAB color coordinates, the printer separations, and direction color. FIGS. 13A and 13B show the first candidate color in the center of honeycomb arrays. The six-pointed star on the left of these figures has six different colored points and shows direction color, corresponding to cyan, magenta, yellow, cyan, magenta and yellow in FIG. 13A and cyan, magenta, yellow, orange, orange and yellow in FIG. 13B (reflecting a color change made by the user that will be reflected in printer separations). In each of these figures, the tint step for each direction color is 5.0%. Note that the number of shells selected in FIG. 13A is 4, which corresponds to the number of indentations delineating the number of honeycomb cells or patches (e.g., at the top of the honeycomb in FIG. 14A, the shells are 1-4, on the upper left side they are A-D, and so on. In FIG. 13B, the number of shells is 8 (as selected by the user). Each cell of the honeycomb represents an incremental change in color corresponding to a 5% tint step increment in the direction away from the central first candidate cell. The color of the tint step corresponds to the point on the star corresponding to the direction away from the central cell. For example, in FIG. 13B, the cell next to 9 shows the presence of cyan (and the first candidate color); the cell closest to 17 shows the presence of magenta (and the first candidate color), and the cell closest to Q shows the presence of orange (and the first candidate color), and so on. The incremental change in color is visible through following a given direction color. Further, the cells between direction colors show the presence of a blend of direction colors, such as the blend of the cyan and magenta and first candidate color in the cells between the center cell and the cells closest to 9 and 17.

Thus, the screen shots depicted in FIGS. 13A and 13B provide a visible representation of an arrangement of candidate colors for a best match to the target color. The representation is virtual, i.e., it is displayed on the screen of a computer monitor.

Again, since the software does not always accurately predict the color separations, a honeycomb of colors, which also is a honeycomb of various inkjet separations, since each color has its own separations, is generated. A match should be found in the first honeycomb, saving time in printing a second iteration.

In block 115, the arrangement of color is printed using a digital proofer, such as a Roland inkjet printer. The print is made on a transparent sheet. This allows for a visual comparison of the printed colors of the array to the physical target color. It also allows for a check of the digital proof to the myColorCloud Digital proof standard stored and accessed in SunColorQC. This provides the user the ability to validate the digital proof best match with a high degree of accuracy.

Figure 6:
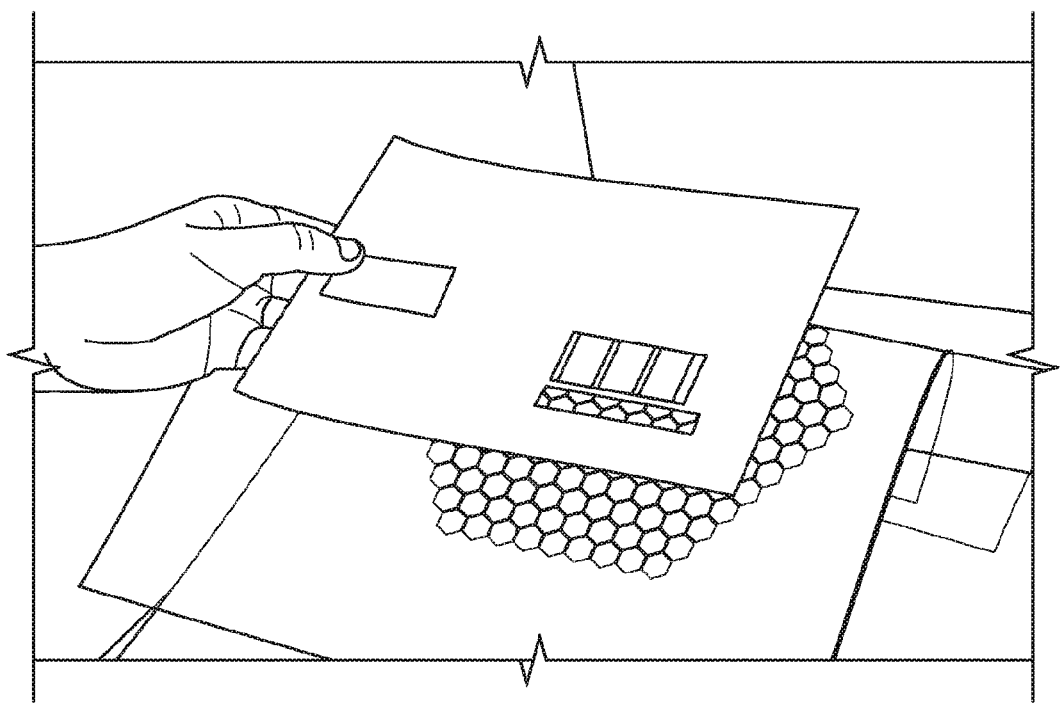
FIG. 6 depicts visual comparison aspects of a method for selecting a best color match to a target color.
Figure 7A:
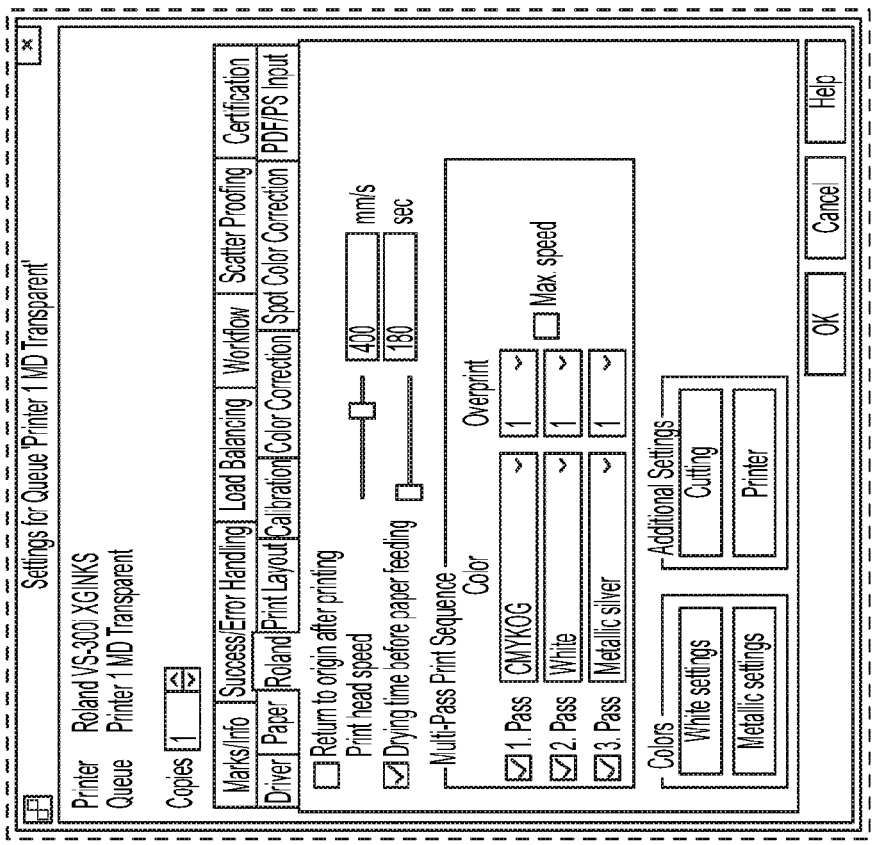
FIGS. 7A, 7B, 7C, and 7D screen shots of a computer monitor displaying printing and process requirements for a printing queue generated by the software suite.
Figure 7B:
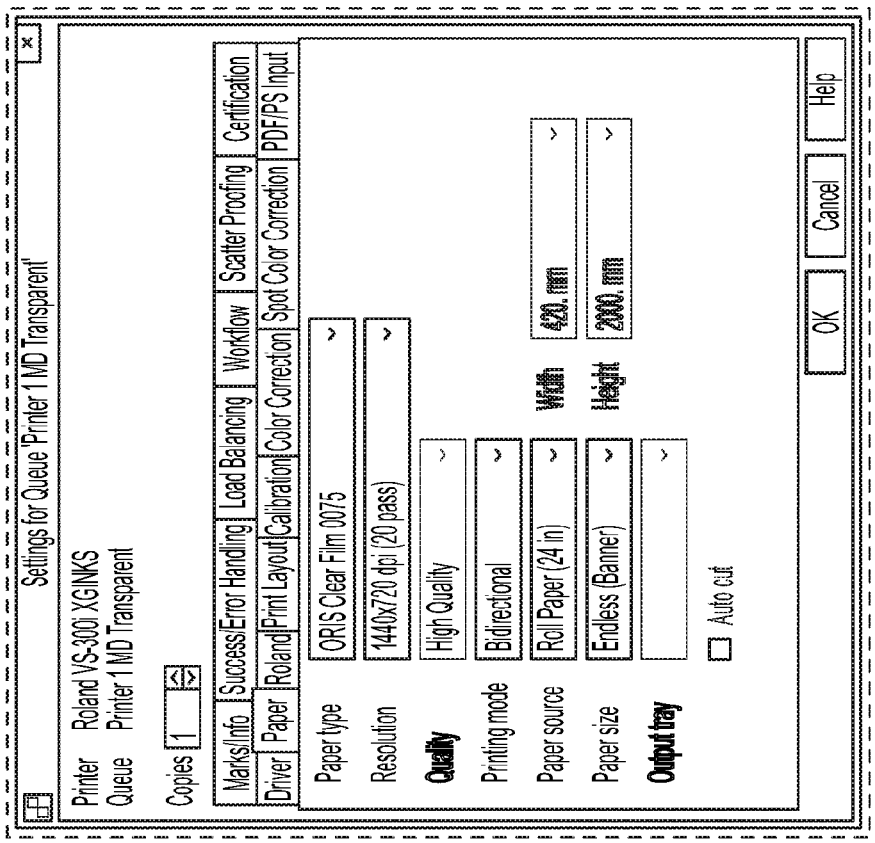
Figure 7D:
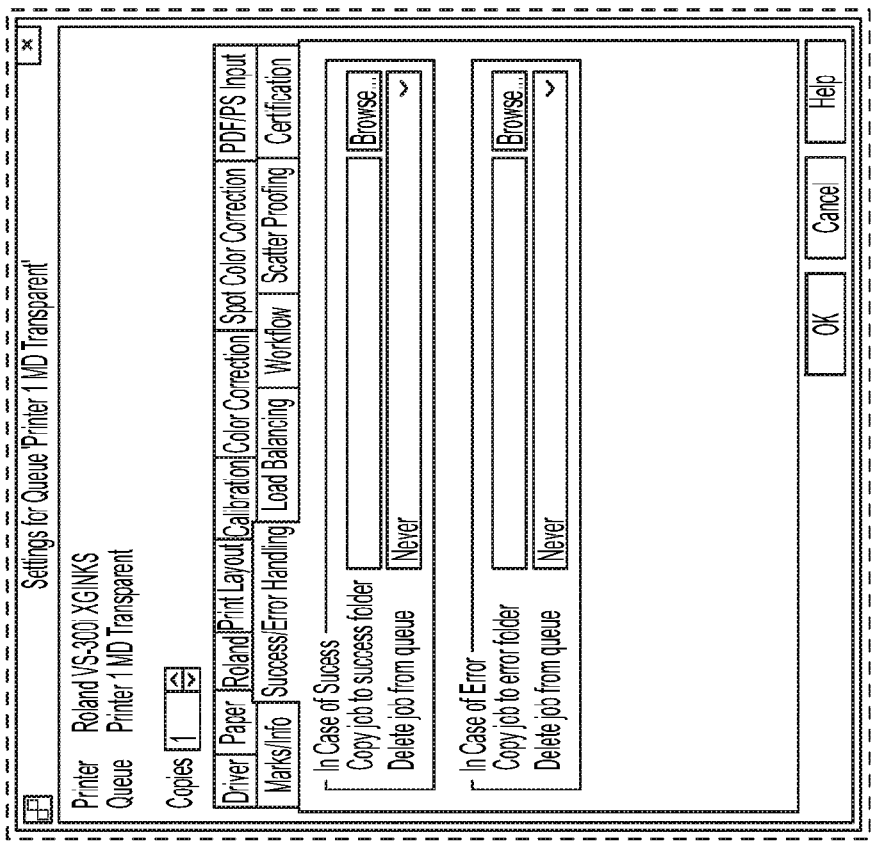
Figure 7C:
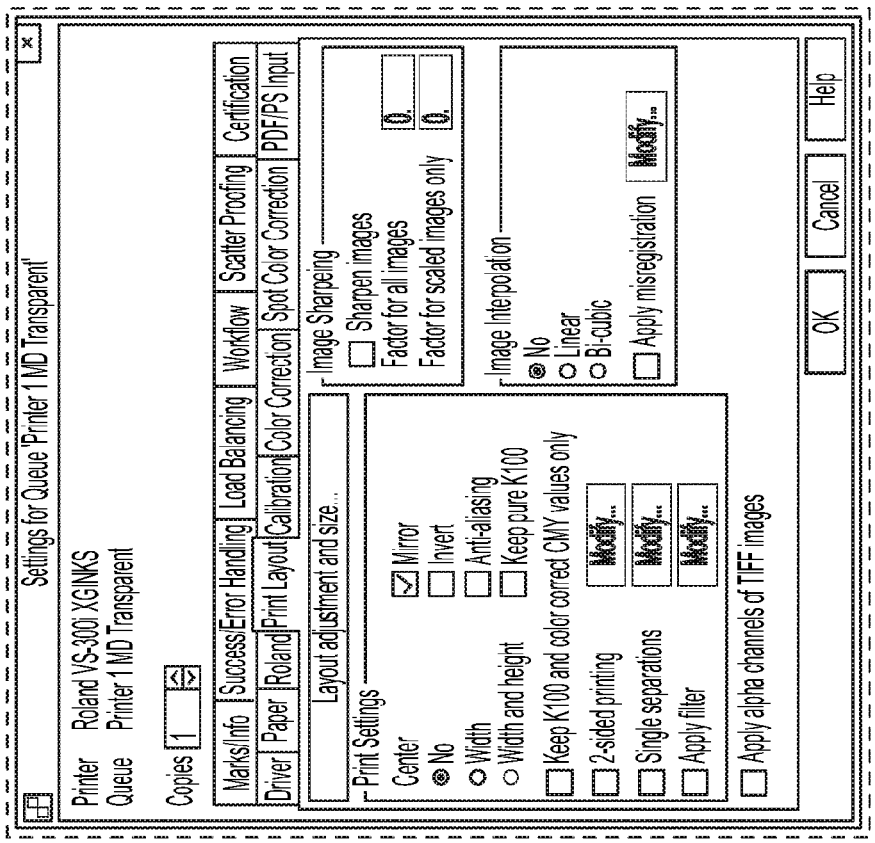

In block 120, a best match to the target color is selected. The best match selection may be performed by overlaying the print of the array of colors over a metal substrate, printed side down, as shown in FIG. 6. The print of the honeycomb array of colors is positioned directly over the metal substrate (which is curved in this instance to simulate the surface of a can).

Figures 18A, 18B, 18C:
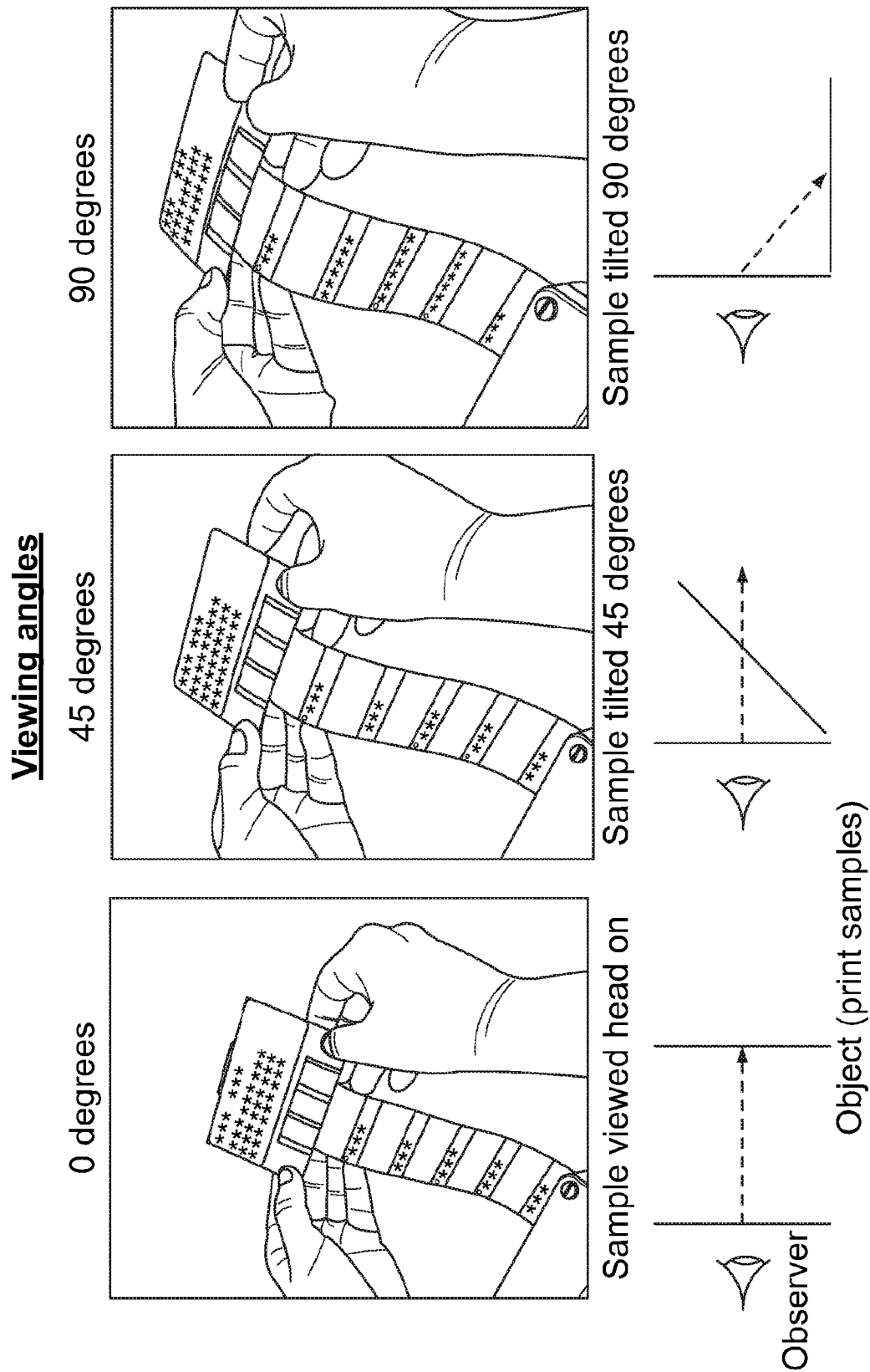
FIGS. 18A, 18B, and 18C depict the viewing angles at which color comparison and selection should be conducted.

In a preferred arrangement, the best march is selected as follows. The transparent print of the honeycomb array is positioned over the metal substrate as indicated above, and as shown in FIG. 6. The colors of the honeycomb are viewed inside a lightbox, the colors each evaluated at angles of 0°, 45°, and 90° under D50 light source, as shown in FIGS. 18A, 18B, and 18C. This manner of evaluation is believed to reduce the likelihood of metamerism, which may occur when comparing colors in varying conditions. Further, evaluating at three different angles is believed to better replicate how the finished product, such as a can, would be perceived by the brand owner or consumer.

In another aspect of the preferred arrangement, four (4) colorists will each select the best match to the target color (shown in the swatch present in FIG. 6) by following the procedure outlined above. The colorists will visually compare the target color on the swatch to the colors printed in the arrangement as displayed over the metal substrate, to simulate a printed metal object (in this case, an aluminum can). Again, the comparison will take place at the three light angles stated above.

This approach provides ease of reproduction in future and minimizes subject interpretation of when creating the digital proofing standard.

In block 125, it is decided if the selected best match is a satisfactory best match to the target color.

In one aspect, a satisfactory best match is arrived at when at least three out of the four colorists agree on a best match.

If the match is not satisfactory, then the process returns to block 105 and the procedure is restarted, again proceeding through blocks 110, 115, 120 and 125. One of the colors shown in the other cells of the honeycomb array displayed in FIGS. 13A and 13B may be chosen as the first candidate for a best match, or a new spot color selected altogether.

If the colorists agree on a best match, the parties may optionally still choose to return to block 105, to generate further iterations and refinements of color based on the best match, and again proceed to blocks 110, 115, 120 and 125.

When a satisfactory match is found, i.e., a best match to a target color, the process proceeds to one or both of blocks 130 and 140. In block 130, the cell or patch representing the best match is saved using the "save" option available in the CGS ORIS Flex Pack software suite. Other information may also be saved, such as the printer separations, other color space information (e.g., CIELAB coordinates), printer settings, other information concerning the digital proofer, etc. The color information may be saved using naming conventions such as the SUN 485D O2P or SUN 485D T 2P. The number is the Pantone reference, D stands for digital, O stands for opaque, T stands for transparent and 2P refers to the two piece can print process. The reference number changes with each color and further, some pantone colors are references such as "Pantone Reflex Blue C". In that case the naming would be SUN ReflexBlueD O 2P or SUN ReflexBlueD T 2P.

Storing the color data as provided for in this step provides parties with the means for reproducing the color in a remote location. For PantoneLIVE colors, this is the digital standard, therefore removing the need to engage in future interpretation.

In block 135, the color data of block 130 is uploaded to the SUN digital proofing database, stored in the CGS cloud, where it can be retrieved by parties permitted to have access to this information. This is advantageous, since the parties would be expected to be remote from each other, yet with the distribution of color data in this way, all can make evaluations following the standardized procedure.

At least one of remote parties who retrieves this information will have an identical setup in terms of the software suite, digital proofer, and/or database access and will print a transparent digital proof and confirm their replication of the best match to the target color. The remote party could also offer feedback on whether the initial best match result is reproducible. With this arrangement, updates and new Pantone or bespoke colors made available in the future can be added to in the database and made accessible to parties and customers.

In block 140, the selected best color match is measured into a color quality software package such as X-Rite Color iQC (measured when positioned over a metallic surface) and named as indicated previously, i.e., SUN 485D O 2P or SUN 485D T 2P. The color measurements may be made with a NetProfiled spherical spectrophotometer into the color quality software package. This allows for measurement of the inkjet proof and then stored as a target standard for quality control of future proofs. The PantoneLIVE Metal Deco library data for cannot be used for quality control because the PantoneLIVE data concerns the measurement of a color on a metal deco substrate with a Metal Deco ink. This is not comparable for proofing purposes. In this case, the spectrophotometer reads the color differently when another technology is used, such as inkjet proofing in the present example. This measurement method into a color quality software package addresses this concern by providing a comparable standard to work with for quality control purposes.

In block 145, the SUN digital proofing MD 2P database, which are available in myColorCloud, and accessed through the SunColorQC software platform. This information can be accessed by interested parties for ongoing validation of the color. The best match color target can be downloaded from myColorCloud into a PantoneLIVE™ enabled quality control software and a comparison can be made to the locally-printed digital proof to ensure the resulting color is within acceptable tolerance.

The procedure of block 145 can be implemented, for example, on final approval of the best match of the target color. It should be understood that a design may employ a number of different colors, and so the described process of selecting best matches, reproducing and confirming same, and ongoing validation may be repeated one or more times for a given project.

With this arrangement, updates and new Pantone or bespoke colors made available in the future can be added to in the database and made accessible to parties and customers.

Users can access the myColorCloud database with a PantoneLIVE™ license and the relevant permissions linked to an X-Rite account, where a PantoneLIVE™ license is used to access permitted myColorCloud libraries. SunColorQC is the X-Rite Color iQC software hosted on servers to access and measure against the databases.

The spot color table is uploaded to a cloud database, such as those mentioned herein, which are accessible through the CGS software by parties granted access to use same. The parties can then replicate the approved color in a remote location by following the "SunColorBox Metal Deco MD Digital Proofing—Proofing Process Guide, version 1.0" (the "user guide"). This guide is explained herein and is also incorporated by reference herein.

The PantoneLIVE™ dependent library created by Sun Chemical, and along with the inkjet proofing and quality control database, provides metal deco printers with a complete solution for a digital color management workflow. This is believed to be a unique solution.

Figure 2:
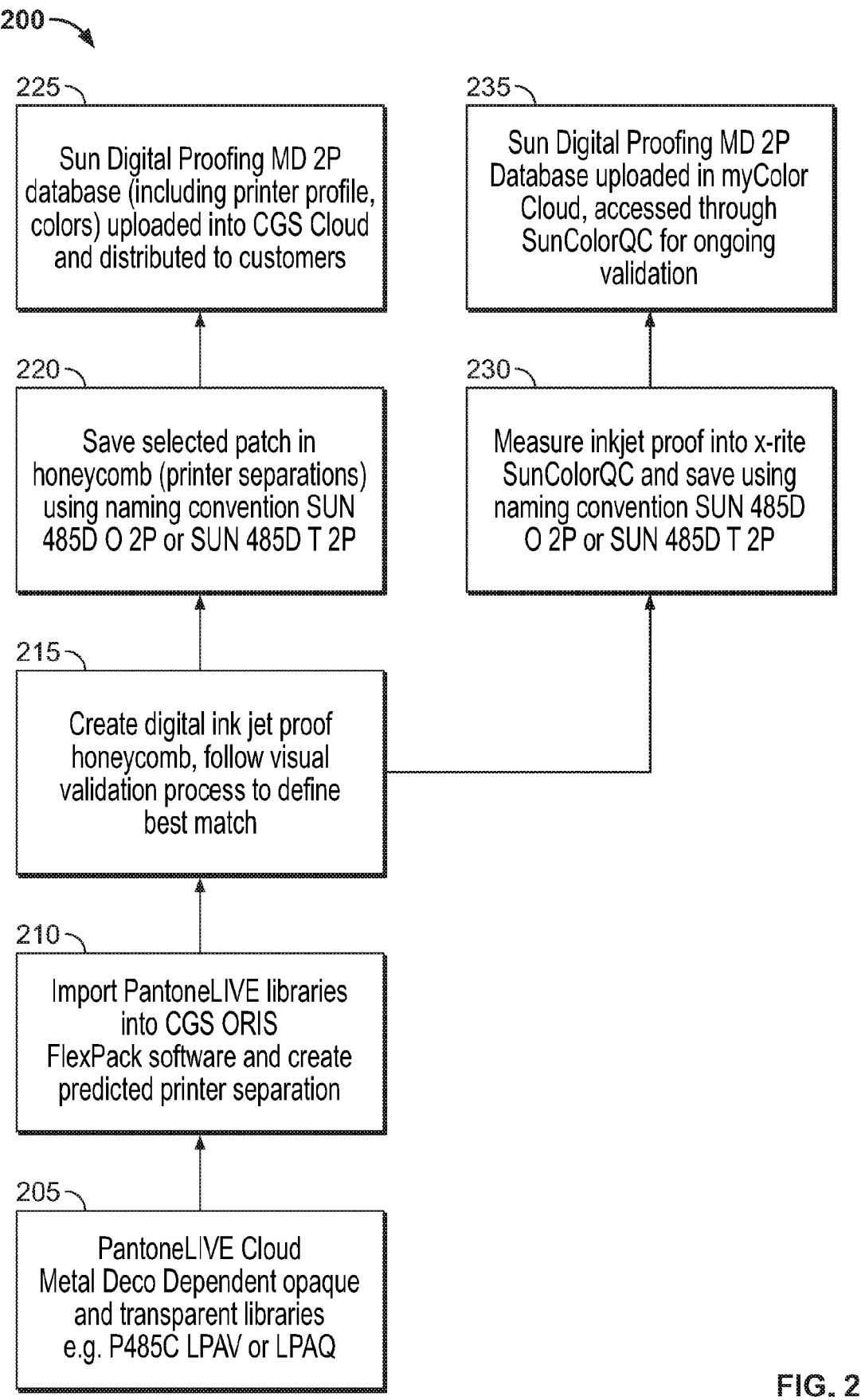
FIG. 2 is a workflow diagram of another exemplary embodiment of a method described herein.

FIG. 2 depicts another block flow diagram 200 of a process in accordance with the present disclosure that is complimentary to and supplements the method depicted in the FIG. 1 block flow diagram 100. In block 205, the PantoneLIVE™ cloud metal deco dependent opaque and transparent libraries are downloaded from a cloud storage device.

In block 210, the libraries are imported into the CGS ORIS Flex Pack software. See FIG. 5, which is discussed later. The libraries can then be used as indicated in block 215, the creation through digital printing of a digital proof honeycomb that include the first candidate color for a best match and further candidate colors.

Block 215 essentially incorporates block 105, 110, 115, 120, and 125 of FIG. 1. The descriptions of those blocks are incorporated by reference into this section.

When a satisfactory match is found, i.e., a best match to a target color, the process proceeds to one or both of blocks 220 and 230. In block 220, the cell or patch representing the best match is saved using the "save" option available in the CGS ORIS Flex Pack software suite. Other information may also be saved, such as the printer separations, other color space information (e.g., CIELAB coordinates), printer settings, other information concerning the digital proofer, etc. The color information may be saved using the SUN 485D O 2P or SUN 485D T 2P naming conventions.

In block 225, the color data of block 220 is uploaded to the SUN digital proofing database, stored in the CGS cloud, where it can be retrieved by parties permitted to have access to this information. This is advantageous, since the parties would be expected to be remote from each other, yet with the distribution of color data in this way, all can make evaluations following a standardized procedure.

At least one of remote parties who retrieves this information will have an identical setup in terms of the software suite, digital proofer, and/or database access and will print a transparent digital proof of an arrangement of colors that includes the best match and will conduct the procedure set forth above in order to confirm or not confirm the selection of the best match to the target color. The remote party could also offer feedback on whether the initial best match result is reproducible.

In block 230, the selected best color match is measured into a color quality software package such as X-Rite Color iQC (measured when positioned over a metallic surface) and named as indicated previously, i.e., SUN 485D O2P or SUN 485D 2TP. The color measurements may be made with a NetProfiled spherical spectrophotometer into the color quality software package.

In block 235, the SUN digital proofing MD 2P database, which are available in myColorCloud, and accessed through the SunColorQC software platform. This information, when stored in the SunColorQC database, can be accessed by interested parties for ongoing validation of the color. The best match color target can be downloaded into a PantoneLIVE™ enabled quality control software and a comparison can be made to the locally-printed digital proof to ensure the resulting color is within acceptable tolerance.

The procedure of block 235 can be implemented, for example, on final approval of the best match of the target color. It should be understood that a design may employ a number of different colors, and so the described process of selecting best matches, reproducing and confirming same, and ongoing validation may be repeated more than one time for a given project. A specialized spot color table may be created.

The capabilities described herein, in which a digital proof can be created in two or more remote locations and still accurately reproduce colors so that a consistent evaluation and selection of colors can be made across the remote locations requires that the digital proofing printers be set up uniformly. In other words, the settings should be consistent with one another. The settings can be found in the user guide, and appear here as well. The following settings were implemented for a Roland VS-300i inkjet printer using CGS XG inks. Those settings can be implemented in the CGS ORIS Flex Pack software, using the setup wizard, and include:

Default selection for continuous tone (proofs from CT data);

The following measurement device settings:

On the Measurement Device screen select device Eye One iO ("Eye One" is also referred to as "i1"), which is a 0/45 X-Rite spectrophotometer. iO is a measurement table used to calibrate an inkjet proofer such as the Roland printer. This allows reference to the central reference profile to ensure remote proofing accuracy.

Use XRGA standard;

Response status: Status E (ISO 5-3);

Filter: None;

Measurement method ISO13655 M0;

Delta E formula: DE2000;

Select "Yes" when asked if a reference printer profile should be used;

Navigate to the stored location of the required Reference Printer file (.rfp)*, select and click OK to proceed. Ascertain that the correct RFP created by CGS for Sun Chemical is available.

Decline the option to have an express calibration performed;

Paper source: Roll Paper (24 in); paper size: Endless (Banner); width 420 mm, height 2000 mm;

Adjustment and size: original size and orientation; scale: factor; scaling facto×100; maintain proportions; orientation: "R";

Postscript/PDF options: define page size and offset by PostScript/PDF Mediabox;

Check boxes for "Keep image spot color separations" and "use overprint commands".

Select "new linearization" on the linearization-calibration window;

Print the linearization test chart;

After printing the test chart, select the option to measure the test chart;

Place the Test Chart onto the Eye-One iO measurement bed and select "Start measurement". If the option to change measurement mode is displayed, then measurement must be made with mode M0, as opposed to M1, M2, M3, etc. Follow the wizard to place the Eye-One iO "sight" over the required printed area and press the physical measurement button on the device. The measurement will begin as soon as the last positioning point is selected.

The color chips displayed on the computer monitor change from transparent to solid once measured and a message will be displayed once the chart is successfully measured.

Select "Use" under the RFP densities so that the target densities for the printer match the Reference Printer (RFP) target densities. Click next.

Two measurements are recommended to optimize linearization. Click "back" to do a further measurement in order to reprint and optimize. Click "next" to proceed forward.

Click next to begin printing the Calibration Test Chart. If required, the white and metallic linearization gradation curves can be adjusted here using the Change White/Metallic Linearization buttons.

Place the printed chart onto the Eye-One iO measurement bed and follow the positioning wizard as previously done with the Linearization Chart. After printing is completed, the print should be left to dry for 10 minutes before measuring, again using the M0 measurement mode.

Repeat the process for additional chart pages and the color chips will become solid in appearance after successful measurement. Click Next to proceed.

The measurements will be displayed, and now there is the option to improve the result by further measurement. This will take the procedure back to the printing of the calibration test chart step for purposes of printing an optimized chart. Follow the optimization until the measurement results are acceptable and then click next.

The next two windows give the option to specify the method color correction. These options can be left at 'None'. Click next to proceed.

The printer setup and calibration process is now complete. Click next to finish the setup wizard. The new queue will now be available under the specified printer on the Main Screen visible in the software suite.

Per the user guide, a new print queue should be added. On the tool bar of the software suite select File>Duplicate Queue (Ctrl+S).

Name the new queue and click OK (in the example it is named "Printer 1 MD Transparent". An opaque queue could also be chosen.

This will open "Settings for Queue 'Printer 1 MD Transparent'".

Check and adjust any print/process requirements for the queue. FIGS. 7A, 7B, 7C and 7D show examples of a setup that can be used.

While still in the "Settings for Queue 'Printer 1 MD Transparent'" window, click the "Spot Color Correction" tab and input a spot color correction table by clicking "new". This will open "spot color correction" window. Click the second browse button, then navigate to the required ICC profile. For example "SunChemical_not_Wh03F080icc" may be chosen.

Click "save as" on the spot color correction window to create the file. Input a new name and click "save".

Spot colors can now be added to the file, for example, by clicking the "Import PantoneLIVE™" button. Next, a "PantoneLIVE™" library is selected, such as for example, "Metal Deco Aluminum Transparent Gloss V" library, and click "import selected". See FIG. 5. These are the PantoneLIVE™ libraries of Metal Deco color standards (either opaque or transparent) which are the targets that the CGS ORIS software uses to make best match prediction. The color standards will now appear in the "Spot Color Correction" file. See FIG. 8. Click "save" to store the added color standards to the file. A "Spot Color Correction" file is where defined printer separations or printer separations that are being refined to achieve a best match to a target color are stored.

In the spot color correction window, the LAB data can be input or the import spot color option can be used to import a .cxf file to measure the target color directly into the application.

Figure 8:
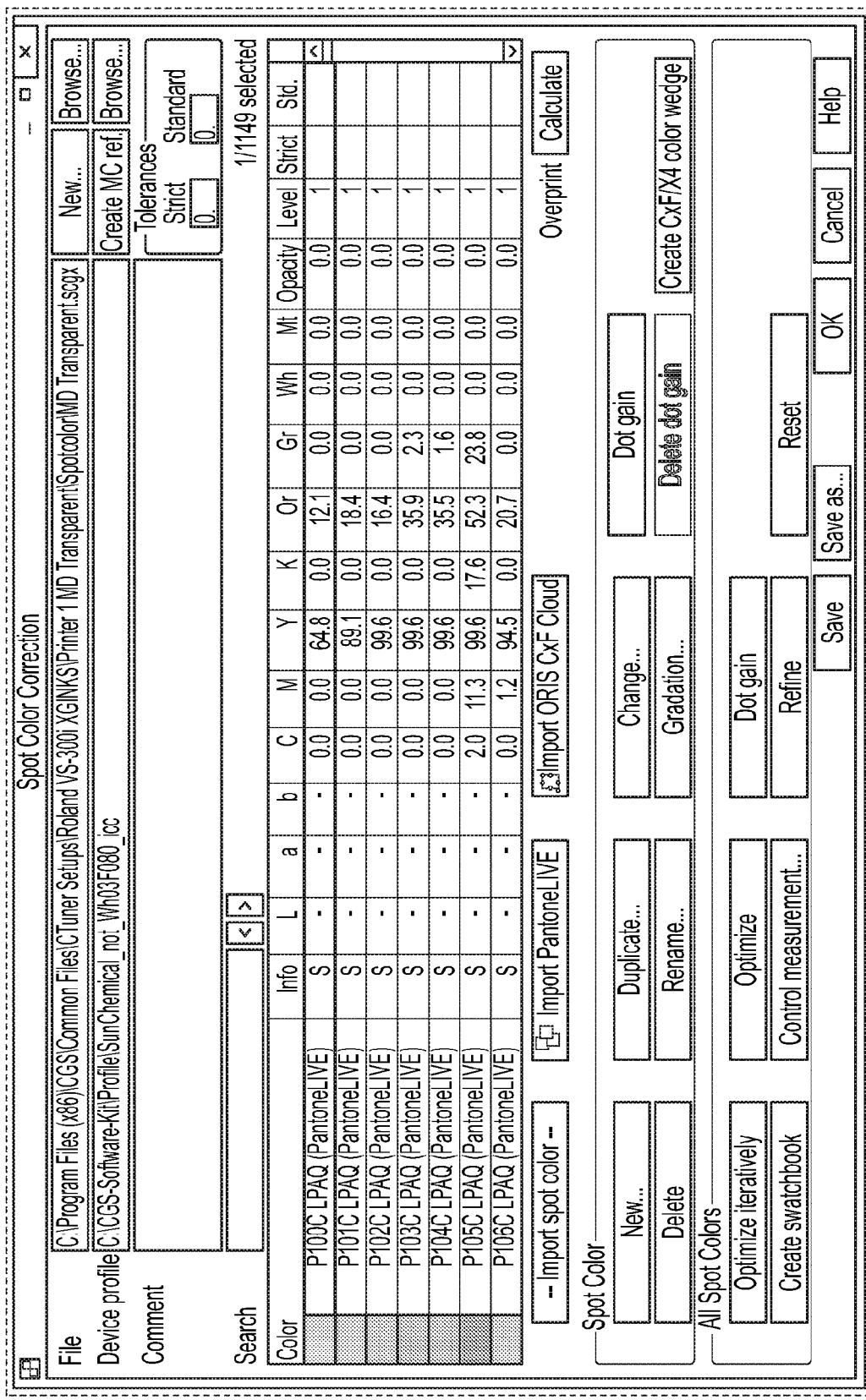
FIG. 8 is a screen shot of a computer monitor displaying a spot color correction file.
Figure 9:
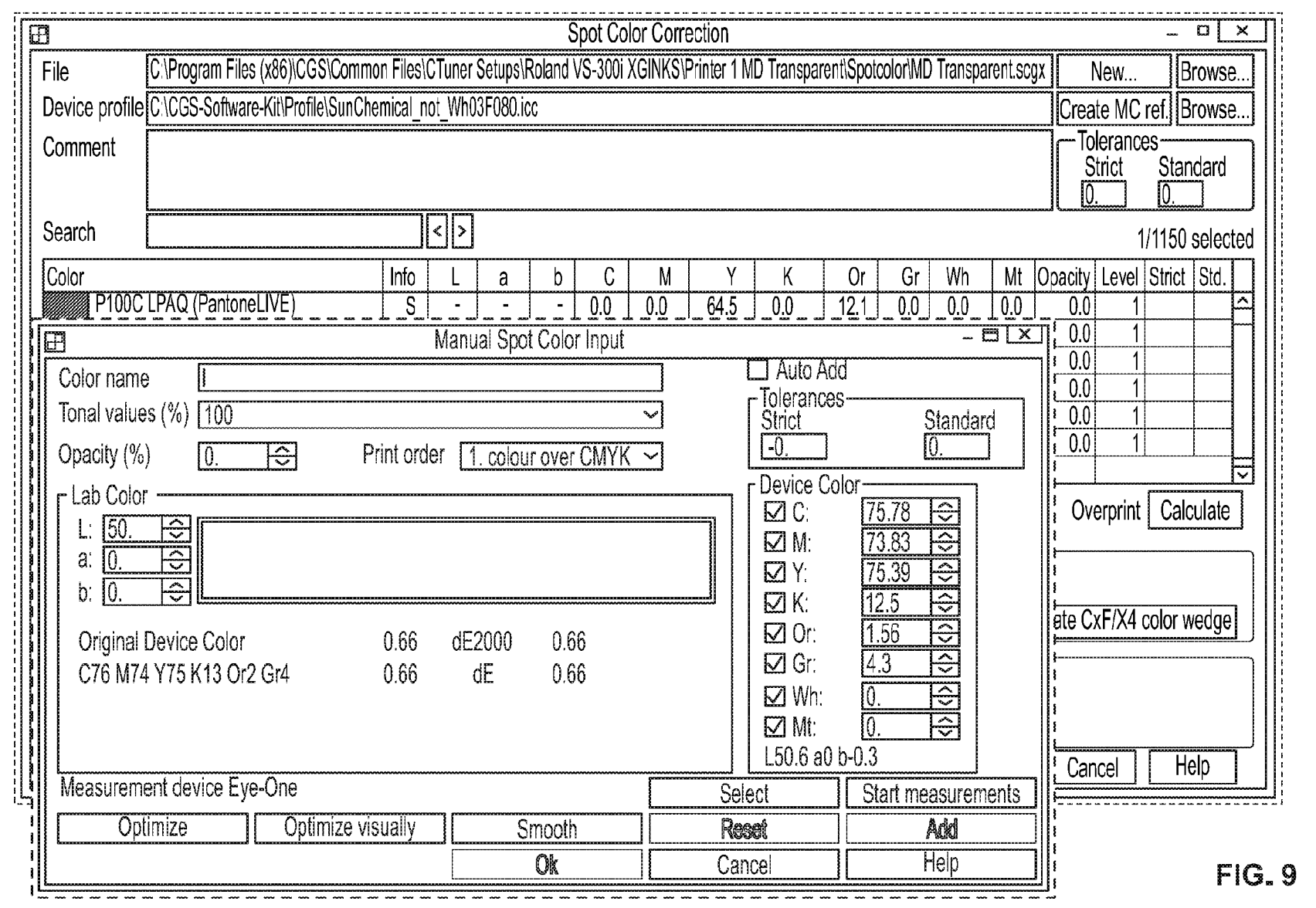

Within the spot color correction window, a spot color can be refined and selected as a first candidate color as a best match. As shown in FIG. 8, a color standard, in this case the PantoneLIVE P100C LPAQ standard, is selected within the "Spot Color Correction" window. Clicking on the "Change" button opens the "Manual Spot Color Input" window of FIG. 9. In this example, a new spot color is created, as any changes made to a PantoneLIVE™ color will be returned to default if the color re-added or refreshed from the PantoneLIVE™ library. This will create the array of colors, i.e., the honeycomb. Colors can be saved under the SUN 100D O 2P or SUN 100D T 2P naming conventions.

Figure 10:
FIG. 10 is a screen shot of a computer monitor displaying a "Manual Spot Color Input" window in which changes to color output are being made.

Within the Manual Spot Color Input window, as shown in FIG. 10, changes to color output can be made, including the name and "Device Color". Click OK to add the color to the spot color list. Here, changes have been made to the color, now named SC MD 100C, which is apparent when comparing FIGS. 9 and 10. FIG. 10 shows that the original device color values shown in FIG. 9 have been changed. (e.g., C is now 0 in FIG. 10, whereas it was 75.78 in the original device color in FIG. 9, and so on for the M, Y, K, Or, and Gr values. Wh and Mt each remain unchanged (Mt is silver or metallic). This occurs after a cell on the honeycomb other than the center cell is selected. This will change one or more the C, M, Y, K, Or and Gr values.

Figure 11:
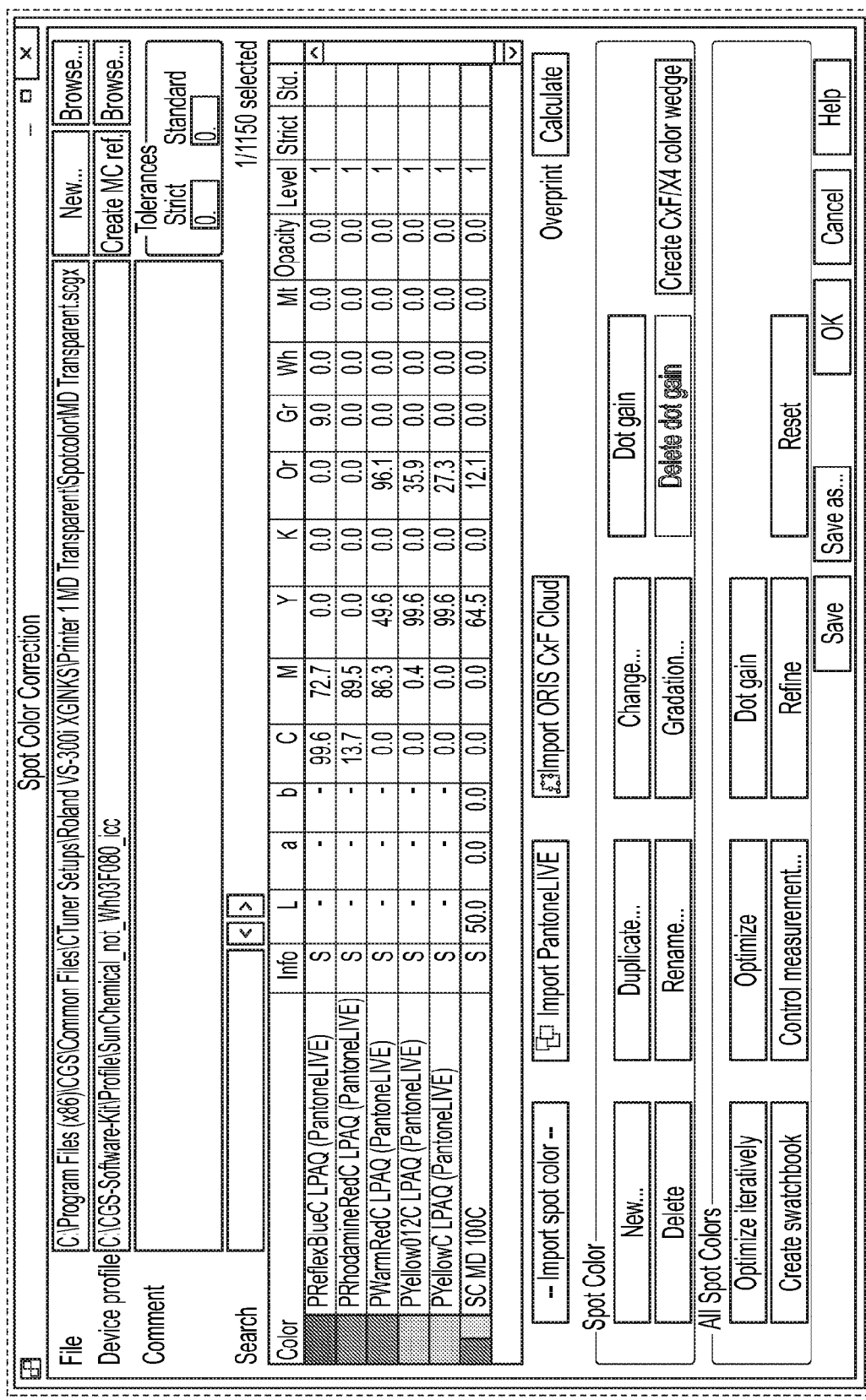
FIG. 11 is a screen shot of a computer monitor displaying the "Spot Color Correction" window with the color "SC MD 100C" selected.

By double clicking on the new or refined color in the "Spot Color Correction" window (i.e., "SC MD 100C"), the manual Spot Color Input window will reopen. See FIG. 11.

Figure 12:
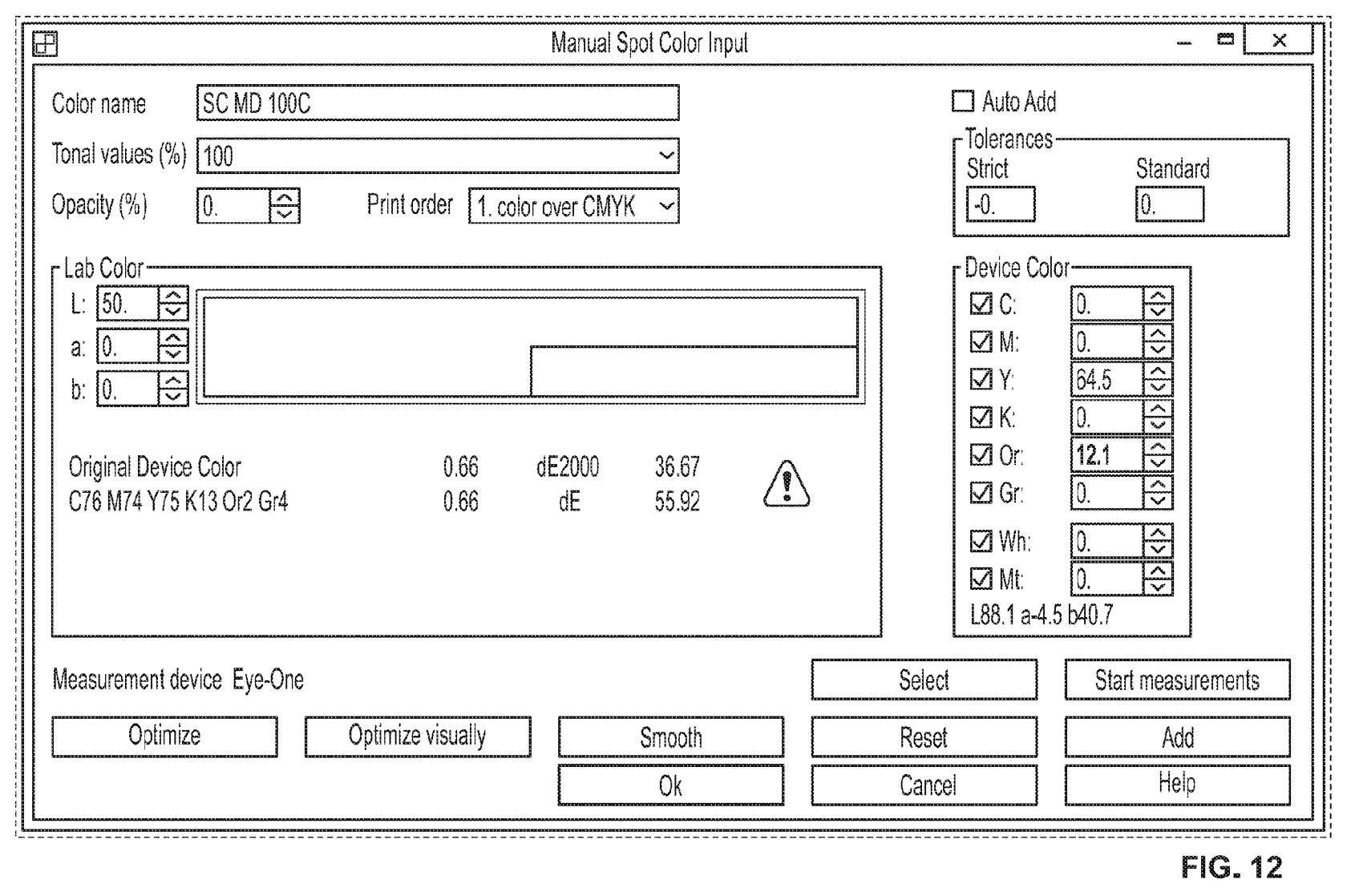

A honeycomb array of candidate colors including the first candidate color and additional candidate colors can be created by clicking the "optimize visually" window in the "Manual Spot Color Input" window that has been opened, which is shown in FIG. 12.

FIGS. 13A and 13B show the opened "Visual Spot Color Optimization" window for "SC MD 100C". With this window open, changes can be made to increase the number of cells within the on-screen visualization and the print. Also, the directional color change for the color can be adjusted according to "Device Color".

FIGS. 13A and 13B show the first candidate color in the center of honeycomb arrays. The six-pointed star on the left of these figures has six different colored points and shows direction color, corresponding to cyan magenta, yellow, cyan, magenta and yellow in FIG. 13A and cyan, magenta yellow, orange, orange and yellow in FIG. 13B. In each of these figures, the tint step for each direction color is 5.0%. Note that the number of shells selected in FIG. 13A is 4, which corresponds to the number of indentations delineating the number of honeycomb cells or patches (e.g., at the top of the honeycomb in FIG. 13A, the shells are numbered 1-4, on the upper left side they are lettered A-D, and so on). In FIG. 13B, the number of shells is 8 (as selected by the user). Each cell of the honeycomb represents an incremental change in color corresponding to a 5% tint step increment in the direction away from the central first candidate cell. The color of the tint step corresponds to the point on the star corresponding to the direction away from the central cell. For example, in FIG. 13B, the cell next to 9 shows the presence of cyan (and the first candidate color); the cell closest to 17 shows the presence of magenta (and the first candidate color), and the cell closest to Q shows the presence of orange (and the first candidate color), and so on. The incremental change in color is visible through following a given direction color. Further, the cells between direction colors show the presence of a blend of direction colors, such as the blend of the cyan and magenta and first candidate color in the cells between the center cell and the cells closest to 9 and 17.

Thus, the screen shots depicted in FIGS. 13A and 13B provide a visible representation of an arrangement of candidate colors for a best match to the target color. The representation is virtual, i.e., it is displayed on the screen of a computer monitor.

The honeycomb is printed by the digital proofer by clicking "print". Upon printing, it is no longer virtual, but rather a physical representation of colors that are candidates for a best match to a target color.

After printing of the honeycomb (again, on a transparent substrate), the visual assessment for selecting a color that is a best match to the target color takes place. This assessment is described above and corresponds to blocks 125 (FIG. 1) and 215 (FIG. 2). Also see FIG. 6, and the discussion thereof provide earlier in this disclosure. The visual assessment is carried out by placing the digital proof printed with the honeycomb array of colors over a metallic film or metal substrate, such as a curved metal substrate simulating the surface of a can. The honeycomb colors are compared to the target color on a color swatch. The comparison takes place in a lightbox emitting D50 light, at angles of 0°, 45°, and 90° in order to find a best match color to the target color. As indicated, the evaluation is performed by experienced colorists. A consensus is reached when at least 3 of the 4 evaluating colorists agree on a best match.

At this juncture, the party may decide that the best match is a satisfactory match to the target color, may decide it is not a satisfactory match and decide to further refine the color, or may simply decide that while it is a satisfactory best match, a further refining of color would be advisable (Block 125 of FIG. 1). Further color refinement or selection of satisfactory best match occurs by clicking on a color cell such as shown in FIGS. 13A and 13B (e.g., a "best match" color cell) and the clicking OK. This will change the Device Color setting again. Clicking a cell other than the center cell would make that cell the center of the honeycomb in the next iteration.

Record the cell location of the best overall match to update the spot color within the CGS Oris Flex Pack software" by clicking on the selected cell.

The spot color can be updated by reopening the "manual spot color input" window, shown in FIG. 10, and clicking the "optimize visually" button. This will open the "visual spot color optimization" window, shown in FIGS. 13A and 13B. What actually will open is the version having the number of shells selected, which in this example is 8, which corresponds to FIG. 13B.

Check that the settings for the honeycomb displayed in this window are the same as those originally used for printing, including the color direction changes, percentage difference and cell numbers. These settings will be present on the printed honeycomb.

Locate the cell location of the best overall match found during the visual validation process and click on it. This will update the 'Device Color' settings after clicking OK.

Figure 14:
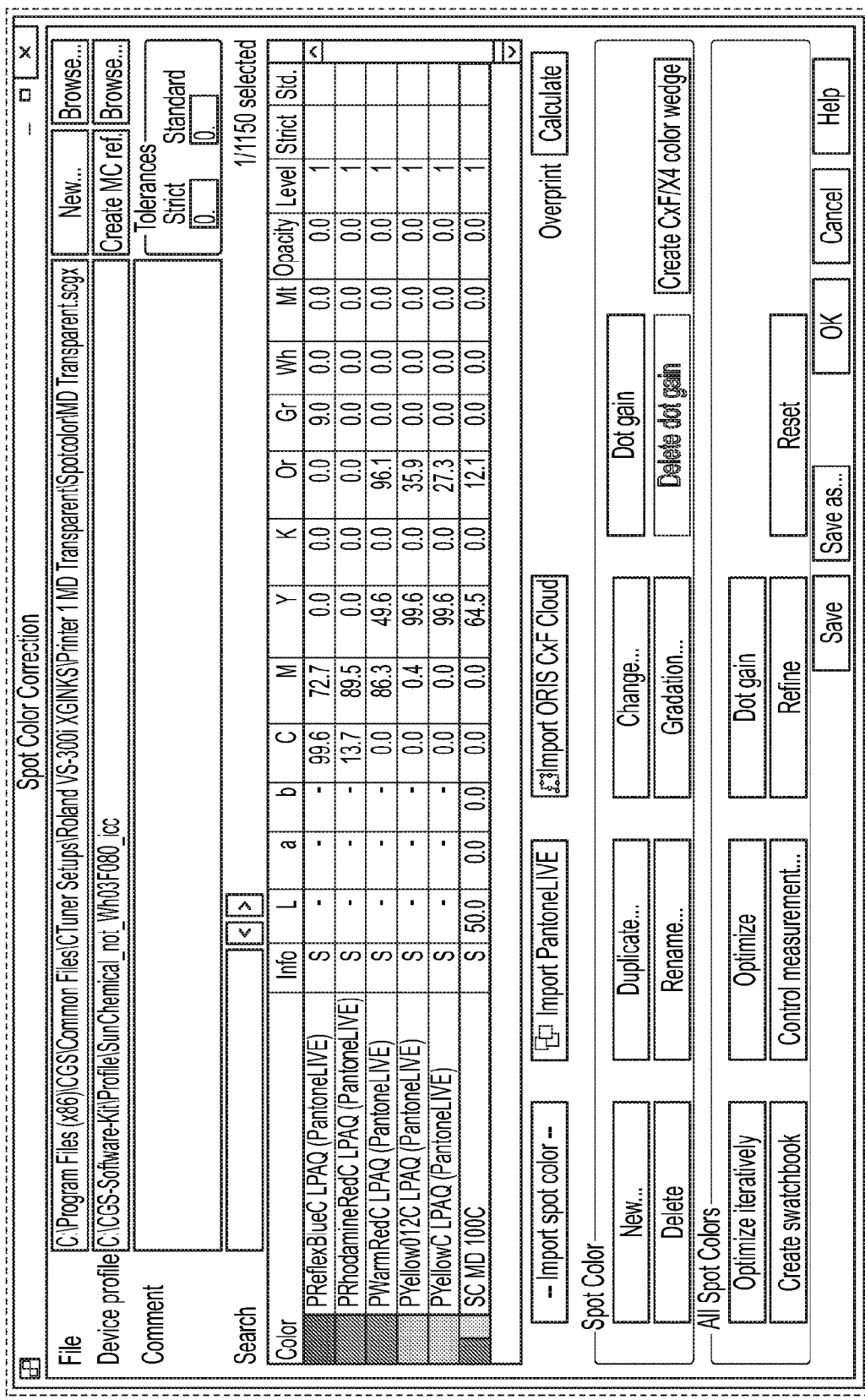
FIG. 14 is a screen shot of a computer monitor displaying the "Spot Color Correction window" after selecting a color from the arrangement of colors in FIG. 13B.

The Visual Spot Color Optimization window will close and display the Manual Spot Color Input window, which will now display the updated 'Device Color' settings, as shown in FIG. 14. Press OK to close the window. The updated Spot Color is displayed within the list of the Spot Color Correction window. Click Save to store the updated values to the spot color list (clicking OK without saving will not store the updated Device Color settings, which will return to their original values on re-opening the Spot Color Correction window).

As indicated previously and as discussed in regards to FIGS. 1 and 2, new color standards may be created once a best match color has been decided upon in the procedures set forth above, using the CGS Oris Flex Pack software and the Roland inkjet printer. The standards are input into the Color iQC software with an optical measuring device. In one embodiment, the optical measuring device is a NetProfiled spherical device, i.e., the X-Rite Ci64 spherical spectrophotomer.

"NetProfiled" or "net-profiling" is the manner of profiling spectrophotometers to match a standard profile so that they all such profiled spectrophotometers measure the same or a close as possible to each other.

With X-Rite Color iQC software open, which is a quality control software package hosted on SunColorQC, a Sun chemical server, click on the 'New from template' icon located on the toolbar. This is the left-most icon on the "Color iControl" window.

In the 'create a job based on a pre-defined job template' window select a desired template. For example, select "Example Job.jt5". Click the 'Open' button.

Figure 15:
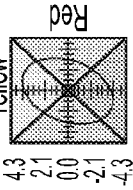
FIG. 15 is a screen shot of a computer monitor displaying the "Color iControl" window in "Measure Standard" mode.

Click on the "Measure standard" icon on the toolbar on the "Color iControl" window. This will open the "measure standard" window, as shown in FIG. 15.

Click the 'Next' button and the prompt will change to 'waiting on Trigger Read 1.

Measure the standards with the Spectrophotometer within 5 seconds, before the system 'times out' (the spectrophotometer communicates with the computer via a USB port or via a Bluetooth connection). The measurements create a standard target for the digital proof which will be used for ongoing quality control, so no further measurement criteria is required other than that for the NetProfiled spectrophotometer when measuring the digital proof sample placed on the metallic surface.

Figure 16:
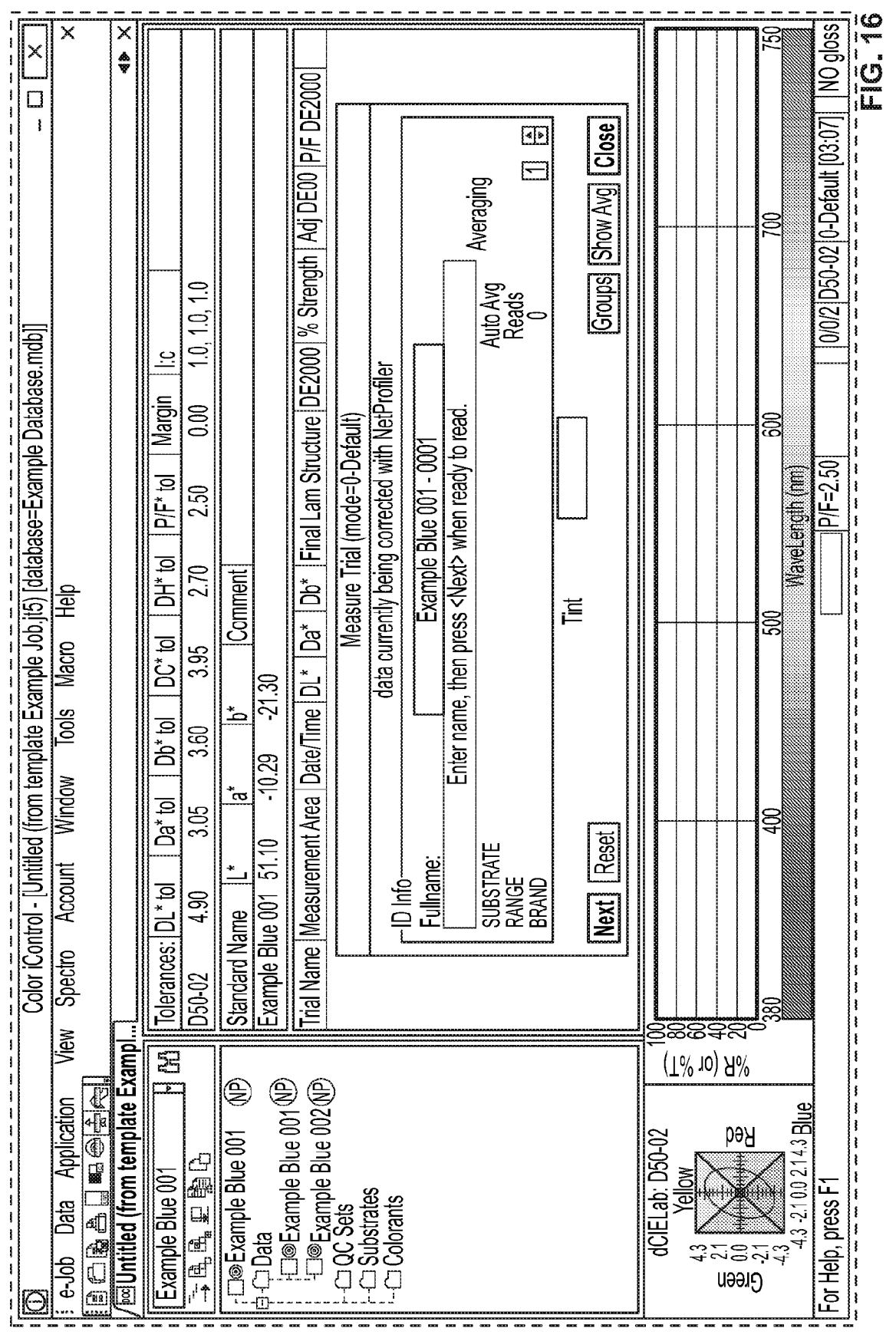

The measured Standard will appear on screen, displaying the Lab references. See FIG. 16.

Click "close to exit the "measure Standard" window.

The measurements in the data folder can be selected and exported as .cxf file for upload into the myColorCloud database or saved into an iQC database.

All color standards imported from myColorCloud or an iQC database can be used for future verification of proofs by measuring trials against the standards for color differences. To do this, open the Color iControl window previously referred to.

With the required job open and standards loaded, done by clicking on the binocular icon and selecting the desired standards from a database, in this case the Sun Digital Proofing MD 2P database, click on the 'Measure Trial' icon on the toolbar.

The 'Measure Trial' window will open. Enter the sample name (e.g., Example Blue 001-0001) into the dialogue box, there is a prompt to click the 'Next' when ready for measurement.

Click the 'Next' button and the prompt will change to 'waiting on Trigger Read 1.

Within 5 seconds, measure the trial with the attached Spectrophotometer, before the system 'times out'.

Figure 17:
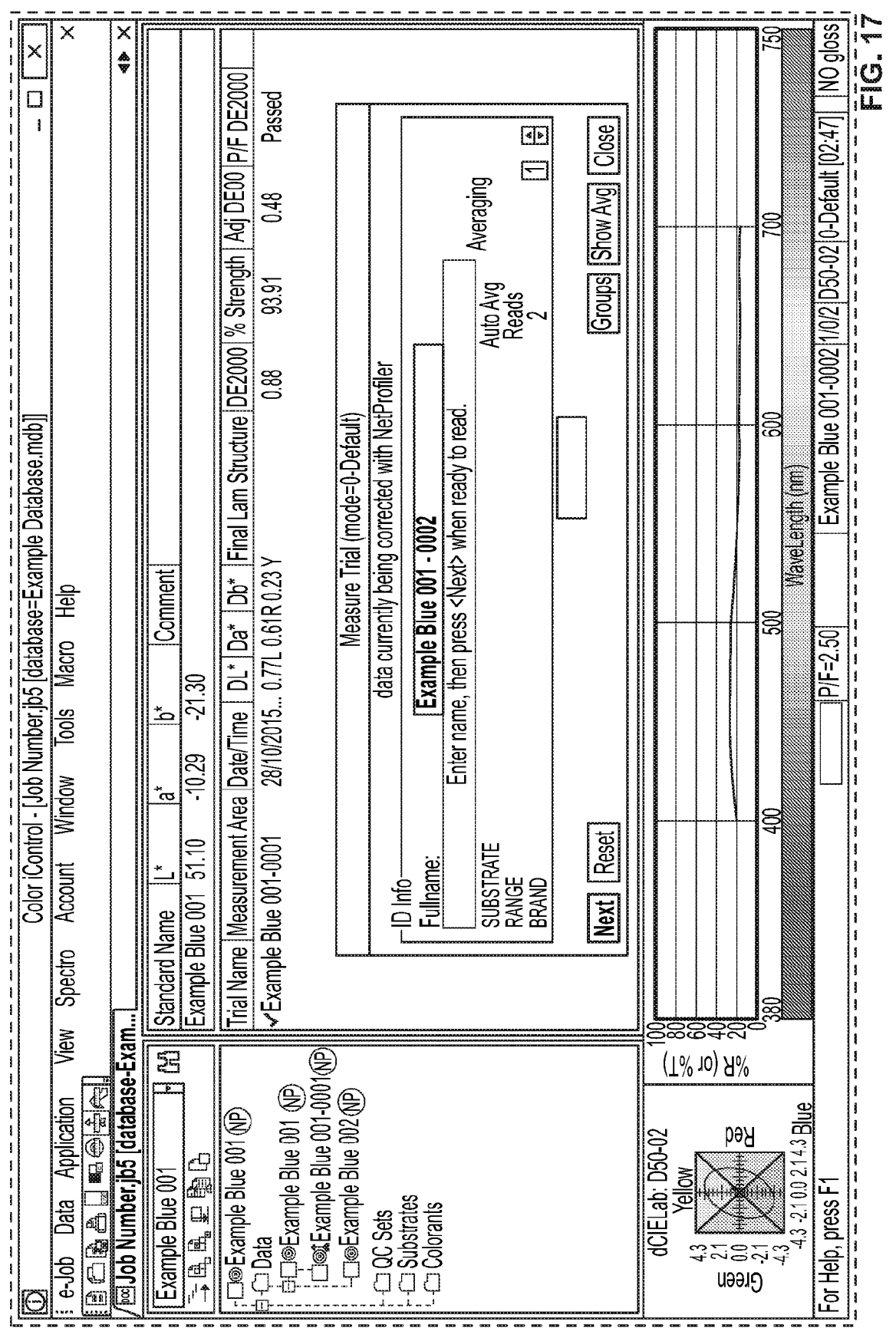

The measured trial will appear on screen, displaying the differences set out in the template compared to the Standard. See FIG. 17. The trial will also be shown as an associated measurement to the current standard, this is shown on the left of the screen with the measured trial color inverted beneath the selected standard.

Click "close" to exit the "measure trial" window. Click e-job on the Color iControl task bar and then save the measurements.

Figure 3:
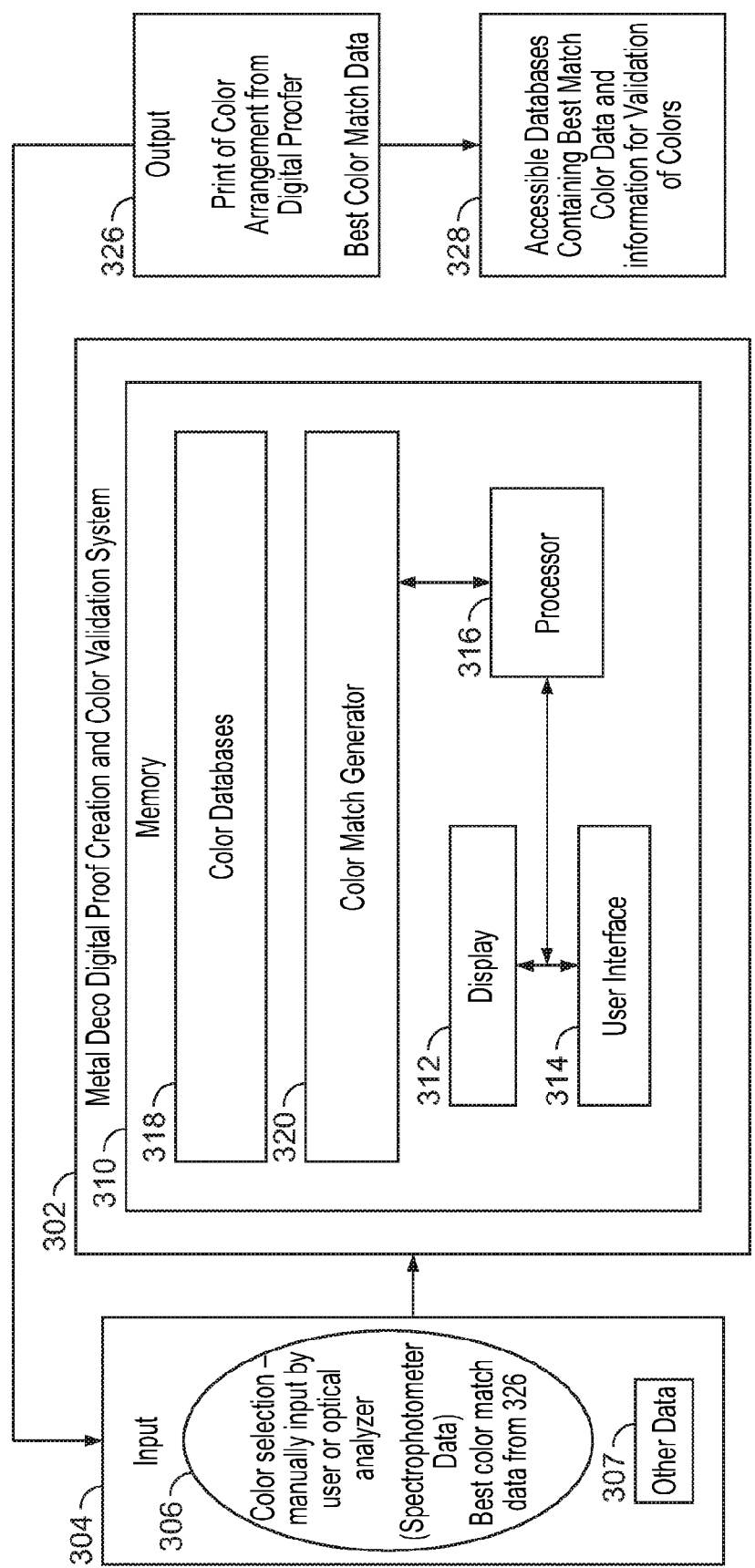
FIG. 3 shows an exemplary embodiment of a system described herein.

Also described herein is a system for creating a digital proof of a metal deco ink of a specific color representing a closest match to a target color. An exemplary system is depicted in FIG. 3.

System 300 in accordance with an embodiment of the present disclosure is shown with respect to an operational environment in which it can be utilized. System 300 includes a metal deco color digital proof creation and validation system 302 that includes one or more processors 316 and memory 310 for storing software applications (such as the CGS ORIS Flex Pack software suite), modules and other data. In one embodiment, the memory unit 310 includes a large number of memory blocks e.g., where calculations, data generation, and data analysis may be performed. The system 300 may also include one or more displays 312 for viewing content, such as the various computer monitor screen shots shown in this disclosure. The display 312 may permit a user to interact with the system and its components and functions. This may be facilitated by the inclusion of a user interface 314, which may include a mouse, keyboard, joystick, touchscreen, or any other peripheral or control to permit user interaction with the system and/or its devices. It should be understood that the components and functions of the system may be represented as one or more discrete systems or workstations, or may be integrated as part of a larger system or workstation.

System 300 is depicted as a computer-implemented system for metal deco color digital proof creation and validation in accordance with an embodiment of the present principles, thereby best color matches to target colors, such as a customer's spot colors.

System 300 receives input 304, which may be the selection of a first candidate color for a best match to a target color. For example, the color selection may be made by selecting same from a color database, shown as 310, such as a PantoneLIVE™ color database, such as a metal deco color database of transparent and/or opaque colors. Such a color selection is shown for example, in FIG. 11, discussed previously. The input may also be the input of spectral color data, such as that data collected during analysis with spectrophotometers. Such optical analysis devices (spectrophotometers, etc.) may interface directly with the system as a user interface, shown in 310. Other data 307 may be input into the system, such as information about the digital proofer, substrate information, etc. Such data may be input into the system during setup of the software, the digital proofer, and the reference printer.

Metal deco color digital proof creation and validation system 302 includes color databases 318, color match generator 320 and optionally, other databases 322. Color databases 318 are accessed and/or queried for candidates to best matches, in the manners indicated previously. These include the PantoneLIVE™ color databases for metal deco colors. The color match generator 320 generates colors that differ incrementally from the first candidate color in one or more color directions, as shown for example in FIGS. 13A and 13B, and the corresponding description of same provided in this disclosure. The color generator, in one aspect, generates incremental colors based on the first candidate color input as shown in FIG. 13B.

The system outputs data 326 as a visual representation of a first candidate color and further candidate colors as described herein, and a printed digital proof of these colors in the arrangement of colors discussed herein. Further, the selected best match to the target color is output 326 from the system, and when designated as a best match, it is input 304 into the system with that designation, as described herein (e.g., by selecting the cell of the honeycomb that corresponds to the best match color.

The system further includes accessible databases 328 for storing color data relating to the best match and for the ongoing validation of the selected best match. The information is generated and stored as indicated in the discussions pertaining to FIGS. 1 and 2, among others. The information stored includes for example best match color data and the data generated in FIGS. 15-17. These accessible databases may be cloud storage databases. Exemplary databases include the SUN digital proofing MD 2P database and the MyColorCloud database, accessible through a QC software package like X-Rite Color iQC hosted on the Sun Chemical platform (SunColorQC). See FIGS. 1 and 2.

A digital library of colors can be created in accordance with the following process, in which "roll outs", which are physical prints of metal deco inks onto metallic substrates, are matched to but not limited to colors present in a Pantone color book (or to bespoke colors). The colors present on the roll outs are measured with a spectrophotometer (e.g., a spherical spectrophotometer) and the digital color data is uploaded to a digital database of metal deco colors, such as the PantoneLIVE Metal Deco Dependent libraries (Metal Deco Aluminium Opaque Gloss V and Metal Deco Aluminium Transparent Gloss V), which are present in PantoneLIVE cloud accessible through the CGS FlexPack software suite.

The process describes the PantoneLIVE libraries, which when printing on an aluminum substrate with Metal Deco ink are a best interpretation of the Pantone book. The SUN 2P digital proofing database in the CGS Cloud is the digital representation of that PantoneLIVE standard realized through the CGS software, using the Roland printer and then the SUN 2P digital proofing database in myColorCloud is for ongoing validation to confirm the replication of that digital proof.

A suitable spectrophotometer is the Ci64 spherical spectrophotomer, which should be net-profiled. The light source and observer angle should be set in Color iQC as D50/2°. Before conducting measurements, the spectrophotomer and roll-outs to equilibrate to ambient temperature for two hours before measuring.

A 2P (i.e., two piece) can holder is also used when measuring with the spectrophotomer. The can holder has an empty open top two piece can be positioned over the cylinder of the can holder with the rollout positioned over the can. The can holder includes a holder for receiving and holding the spectrophotometer so that readings can be taken considering the circumference of the can in the round and not flat.

Roll outs are prepared by printing metal deco color inks onto flexible metallic substrate material using an IGT proofer, which is a proofing machine that applies metal ink to aluminium under controlled conditions to simulate a metal decorating machine press. The proofer prints on flexible aluminum, such as an aluminum can cut and flattened prior to the proofing process, which provides a flattened surface for receiving the ink. An overprint varnish is applied over the printed ink and the resulting material is cured at 210° C. After the above-described waiting period, the printed metal deco color is viewed inside a light box lightbox emitting D50 and TL84 light, at angles of 0°, 45°, and 90°.

In one aspect, the roll out contain a number of parallel strips of printed colors, such as three parallel strips (with overprint varnish (OPV) applied over the color strips). The printed strips may differ in ink weight applied, e.g., one strip may be of the lessest ink weight of the set (representing a lighter print), another strip may be greatest ink weight of the set (representing a darkest print), and another may be of an ink weight intermediate of the other two.

The metal deco ink color present on the rollouts are then compared to colors in the Pantone book, viewed in the lightbox and matched to a color that is selected. In this way, a metal deco ink color can be matched and used to define the corresponding digital proof standard present in a database. For example, for a PantoneLIVE color the SUN 2P digital proofing database would be used, e.g., Correlating PantoneLIVE P485C LPAV or P485C LPAQ with SUN 485D T 2P or SUN 485D O 2P.

A specific area of the printed color on the roll out is selected for optical analysis with the spectrophotometer. This can be done by identifying the selected area by laying a template over the roll out and measuring a target measurement area defined by the template (e.g., in an area defined by an opening in the template, which area will be marked by the evaluator for future reference and evaluation purposes).

Measuring the spectral data with the spherical spectrophotometer allow for entries to be created for three databases, which correspond to the lightest, standard (i.e., intermediate) and darkest versions of the rollouts, which represent the different film weights, 0.15 cc (light); 0.20 cc (standard); and 0.25 cc (dark). This was done with the all colors matched and loaded in an iQC database (naming protocol for this database is below). The color data and other identifying information will then be uploaded to the PantoneLIVE digital library, though ordinarily it is only the standard film weight data that gets placed in this library.

When using the can holder with the spectrophotometer, the spectrophotometer should be positioned in order to minimize or eliminate the gap in between the can holder and the measurement base of the spectrophptometer. This can be done by pressing the spectrophotometer into its holder so that gap disappears.

The naming protocol for the iQC database is as follows. This is an intermediate naming convention as this data is sent to x-rite to create the PantoneLIVE library standards. So the measurements are checked, averaged and validated and then uploaded with the correct PantoneLIVE naming convention e.g. P524C LPAV or P524C LPAQ:
MD is for Metal Deco measurements;
AL is the substrate, (aluminum);
O or T is the version used Opaque or Transparent;
L/S/D is the film weight Light/Standard/Dark, 0.15 cc/0.2 cc/0.25 cc
1/2/3 is the reading angle 0°/45°/90°.
Thus, P524C MDAL O L 2 would be PMS 524 C for Metal Deco on Aluminum Opaque measured at 0.15 cc (Light) at 45 degrees.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A method for identifying a best match to a metal deco target color and distributing the best match to interested parties, comprising the steps of:
   A) i) establishing white and metallic linearization gradation curves for use in a computer implemented environment;
      ii) selecting a first candidate color as a match to a metal deco target color from a database of metal deco ink colors;
   B) generating in a computer implemented environment an arrangement of colors comprising the first candidate color and one or more further candidate colors that differ from each other in color increments;
   C) printing on a transparent sheet the arrangement of colors to create a digital proof of the plurality of colors;
   D) laying the digital proof over a metal substrate to provide a simulation of the application of metal deco colored inks on the metal substrate; and
   E) selecting a color from among the arrangement of colors on the digital proof as a best match to the metal deco target color; and
   F) storing color data of the best match to the metal deco target color, wherein the color data comprises CIELAB color space information, in a computer storage location for retrieval by other parties.

2. The method of claim 1, wherein color data for the best match to the metal deco target color further comprises one or more of printer separations, information concerning the digital proofer, and digital proofer settings.

3. The method of claim 1, wherein a print of the color that is the best match to the metal deco target color is measured by an optical device such as a spectrophotometer in order to provide data used to assess that within a desired tolerance, output of the digital proofer accurately reproduces the previously defined digital representation of the desired color, wherein the data of the previously defined digital representation of the desired color are stored in a data base, and to provide validation data to validate the printed color against the previously defined digital representation of the desired color.

4. The method of claim 1, wherein the target color and the best match to the metal deco target color are spot colors.

5. The method of claim 4, wherein the spot colors are bespoke spot colors.

6. The method of claim 1, wherein the target color is provided by a target color representation, such as a color swatch that is the target color printed on a substrate.

7. The method of claim 1, wherein the step A selection of a first candidate color is performed by selecting a color from a metal deco color database.

8. The method of claim 1, wherein the step A selection of a first candidate color is performed by optically analyzing a physical specimen that includes the metal deco target color with a spectrophotometer to obtain color data such as printer separations for the target color representation and then assigning the same data in into the computer implemented environment of step B.

9. The method of claim 1, wherein the first candidate color and one or more further candidate colors that differ incrementally from each other differ incrementally in one or more of the CIELAB color space and in printer separations.

10. The method of claim 1, wherein the stored color data of the best match to the metal deco target color comprises the printer separations.

11. The method of claim 1, wherein the first candidate color and one or more further candidate colors are visually arranged in an array comprised of cells that correspond to the first candidate color and one or more further candidate colors, such as a honeycomb array comprised of cells that correspond to the first candidate color and one or more further candidate colors.

12. The method of claim 1, wherein the best match to the metal deco target color selected in step E is saved to computer storage by selecting and saving a cell corresponding to same that is present in a computer generated visual representation of the arrangement of colors, such as an array of colors such as a honeycomb array of colors.

13. The method of claim 1, wherein the printer separations of the best match to the metal deco target color selected in step E is saved to computer storage.

14. The method of claim 1, wherein the metal substrate of step D has a curved surface.

15. The method of claim 1, wherein the selecting of the best match in step E comprises: evaluating the digital proof comprising the first candidate color and one or more further candidate colors as the proof is positioned over the metal substrate in a lightbox and inspecting each color at angles of 0°, 45°, and 90° under D50 light source, and then selecting the best match to the metal deco target color.

16. The method of claim 1, wherein the color that is selected a best match to the metal deco target color in step E is then selected as the first candidate color in step A and then steps B to F, and optionally steps F1 and/or F2, are performed again, wherein:

step F1 is a step in which color data for the best match to the metal deco target color, along with other pertinent information selected from printer separations, CIELAB color space information, information concerning the digital proofer such as proofer model, and digital proofer settings is saved to computer storage where it can be distributed to, or retrieved by, one or more parties with access to the storage device, and step F2 is a step in which the printed color that is the best match to the metal deco target color is measured by an optical device in order to determine whether the output of the digital proofer accurately reproduces the previously defined digital representation of the desired color and to provide validation data to validate the printed color against the previously defined digital representation of the desired color.

17. A method of selecting and validating a standard color as a best match color comprising:

A) accessing a database that comprises Pantone reference colors;

B) correlating a Pantone reference color present in an accessible design file present in the database to a digital proof color target;

C) printing the digital proof color target onto a transparent sheet to provide a digital proof;

D) laying the digital proof over a metal substrate to provide a simulation of the application of metal deco colored ink on a metal substrate; and E) measuring the digital proof while layed over the metal substrate with a sphere spectrophotometer and comparing generated spectrophotometer data to corresponding data for the digital proof color target present in a further database in order to validate the digital proof as a reproduction of digital proof color target.

18. The method of claim 17, wherein the database is hosted in a cloud computing environment.

19. A system for creating a digital proof of a metal deco ink of a specific color representing a closest match to a target color; one or more inputs through which a first candidate color for a target color match is received by the system; a target color match generator that generates a plurality of colors comprising the first candidate color and one or more further candidate colors that differ from each other in color increments; a digital proofer for printing the plurality of colors on a transparent sheet to create a digital proof comprising the plurality of colors printed in the sheet; an input for selecting a color from among the array of further candidate colors printed on the digital proof as a second candidate color and a spectrophotometer, preferably a spherical spectrophotometer.

* * * * *